United States Patent [19]
Ishida et al.

[11] Patent Number: 5,657,737
[45] Date of Patent: Aug. 19, 1997

[54] AIR-FUEL RATIO CONTROL SYSTEM

[75] Inventors: Akira Ishida, Sakai; Masuo Takigawa, Ikoma; Tatsuya Nakamura, Yokohama; Norihiro Fujioka, Fujisawa, all of Japan

[73] Assignee: Matsushita Electric Industrial Co., Ltd., Osaka, Japan

[21] Appl. No.: 592,677

[22] Filed: Jan. 26, 1996

[30] Foreign Application Priority Data

Jan. 27, 1995 [JP] Japan .................................. 7-011738
Oct. 3, 1995 [JP] Japan .................................. 7-255985

[51] Int. Cl.⁶ .................................................. F02D 41/14
[52] U.S. Cl. ........................... 123/674; 123/690; 123/698
[58] Field of Search .................................. 123/361, 399, 123/416, 417, 419, 436, 480, 488, 571, 672, 673, 674, 690, 698; 364/431.4, 431.05

[56] References Cited

U.S. PATENT DOCUMENTS

| | | | |
|---|---|---|---|
| 5,247,445 | 9/1993 | Miyano et al. | 123/488 X |
| 5,361,213 | 11/1994 | Fujieda et al. | 123/436 X |
| 5,477,825 | 12/1995 | Hattori et al. | 123/399 |
| 5,535,135 | 7/1996 | Bush et al. | 123/672 X |
| 5,539,635 | 7/1996 | Keeler et al. | 123/672 X |

FOREIGN PATENT DOCUMENTS 63-314339  12/1988  Japan .

*Primary Examiner*—Tony M. Argenbright
*Attorney, Agent, or Firm*—McDermott, Will & Emery

[57] ABSTRACT

An air-fuel ratio control system which calculates a basic injection amount of fuel by state detecting sensors (21) each of which detects an operating state of an internal combustion engine, air-amount detecting sensors (22) each of which detects an intake air amount, an air-fuel ratio sensor (23), and a predetermined data group. Further, the air-fuel ratio control system stores past amount data of injected fuel and air-fuel ratio data at each control cycle. A neuro-computation unit (29) reads values of the data detected by the sensors (21,22) and the stored data to obtain an air-fuel ratio estimate to calculate a correction injection amount of fuel by a neural network of a forward neuro-computing unit (210), which has learned beforehand about relations of the injected fuel amount, the detected air-fuel ratio, parameters, and dead time.

22 Claims, 25 Drawing Sheets

Conceptual diagram of manifold-sticking-fuel model

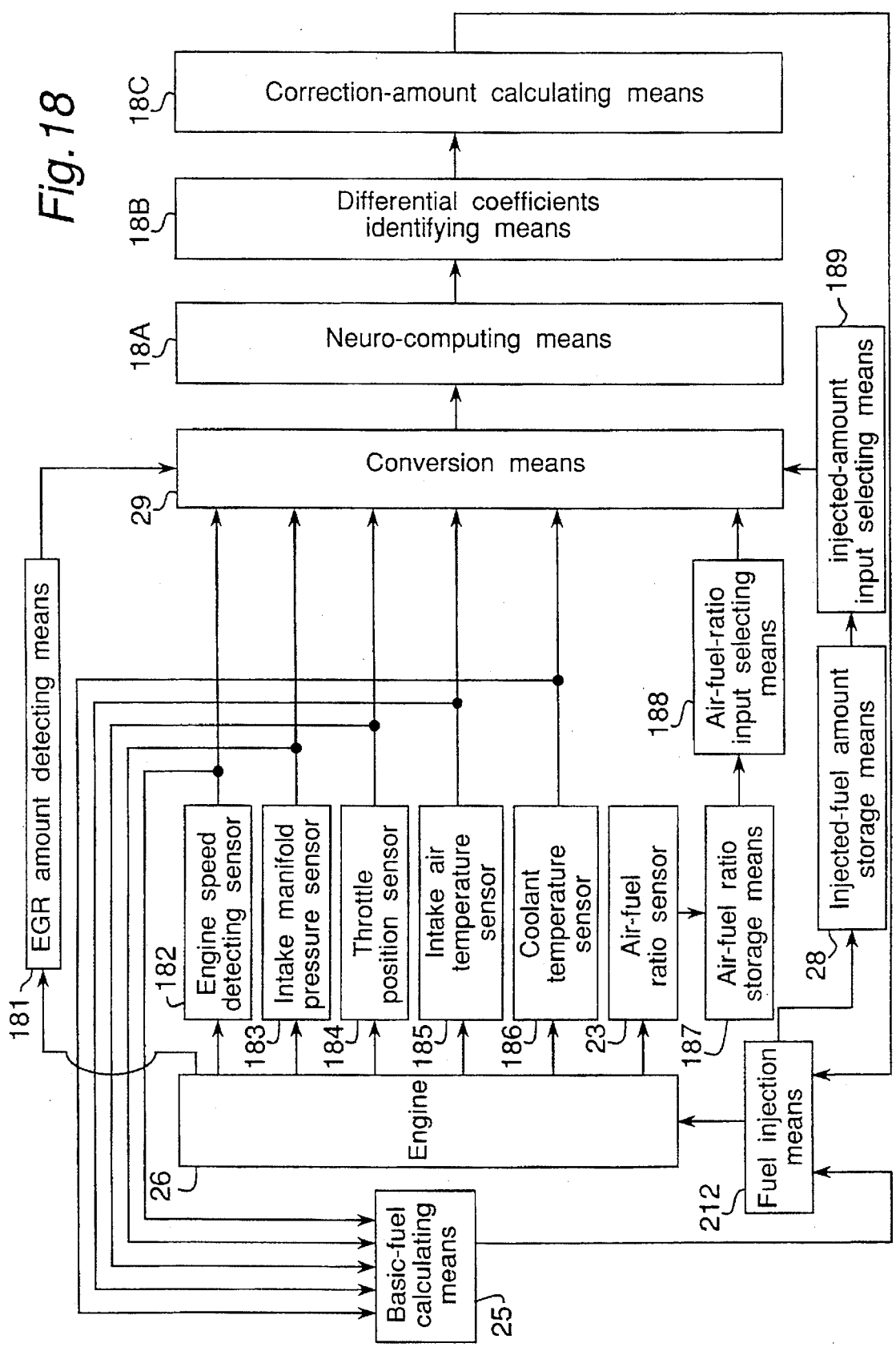

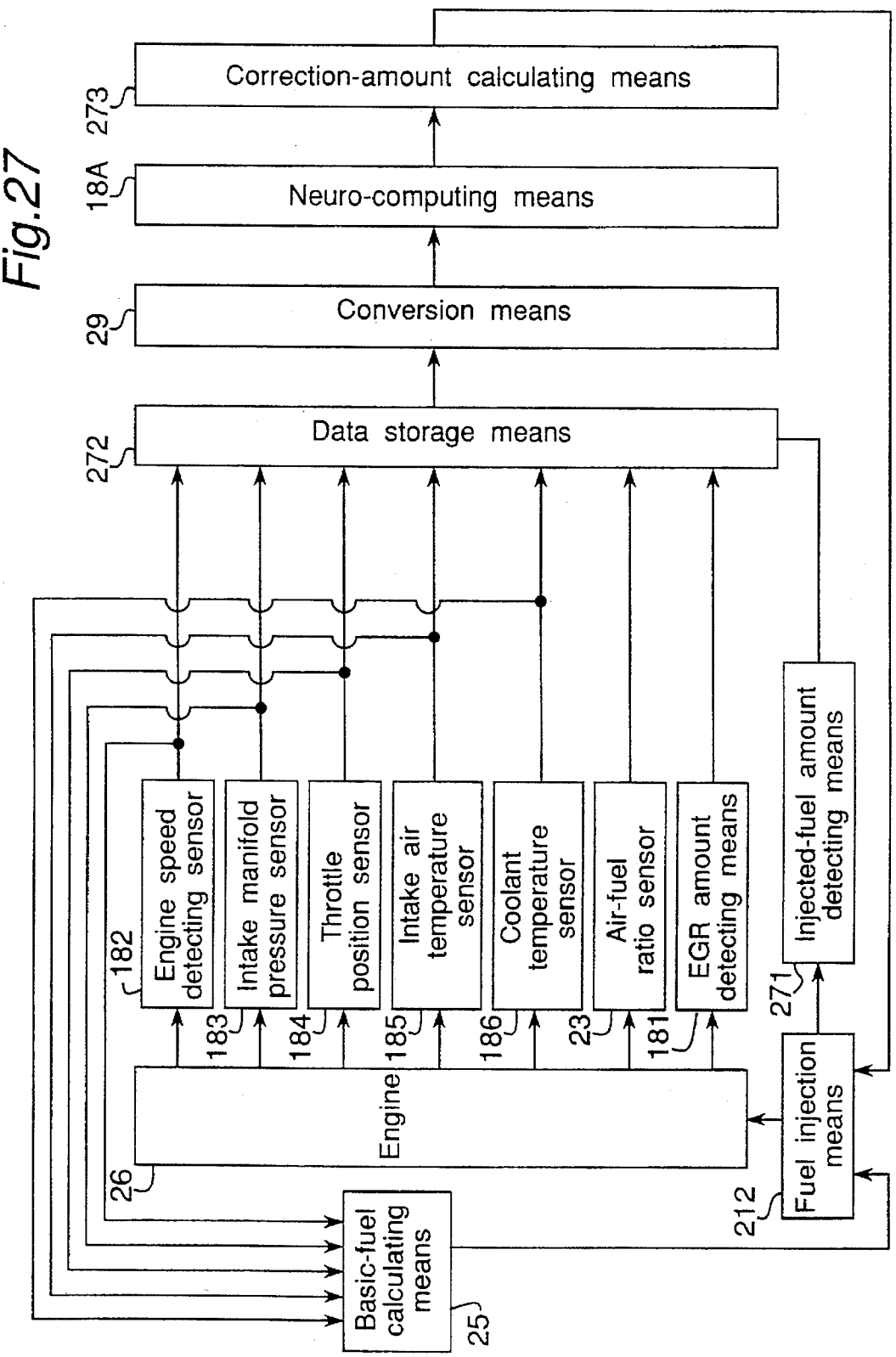

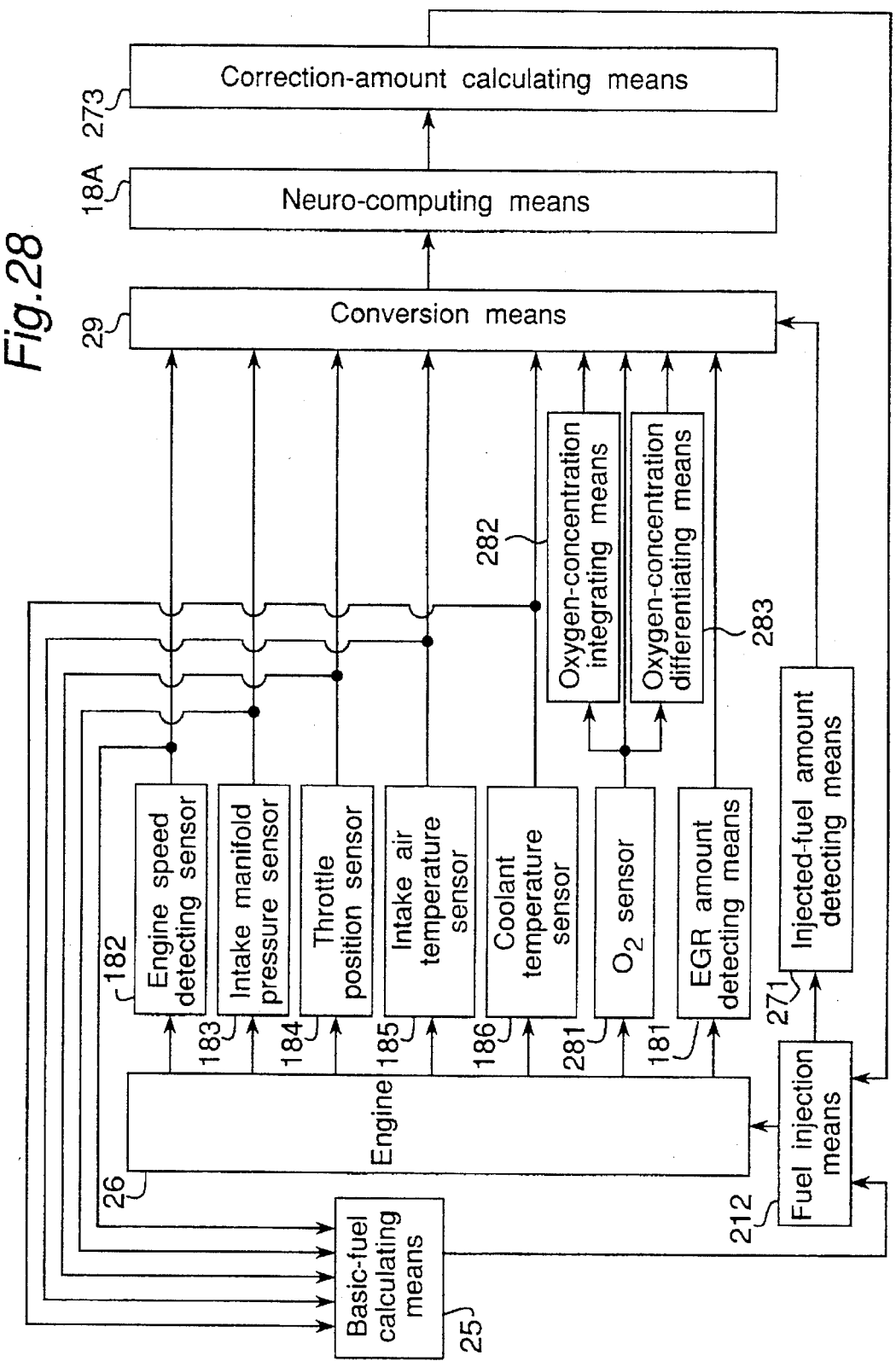

AIR-FUEL RATIO CONTROL SYSTEM

BACKGROUND OF THE INVENTION

1. Field of the Invention

The present invention relates to an internal combustion gasoline engine having a fuel injection control system, and more particularly to a control system which controls an air-fuel ratio of the engine.

2. Description of the Prior Art

A prior air-fuel ratio control of the engine has been usually a PID feed back control using an $O_2$ sensor or an air-fuel ratio sensor. It has been successfully performed in a stationary operating state such as during dead time. It performs fuel increase correction and decrease correction in a transient state such as during acceleration and deceleration. However, a part of injected fuel drops out of air-fuel mixture to stick to the wall of an intake manifold and an intake valve, and a part of the sticking fuel evaporates to rejoin the mixture. Therefore, it can not control the air-fuel ratio at an exact target value in the transient state such as during acceleration and deceleration.

On the other hand, techniques have been proposed to create a model that incorporates the sticking fuel. For example, Japanese Pat. Kokoku Hei 5-73908 defined the sticking rate that the injected fuel sticks to the valve and the wall, and an evaporation time constant to correct the air-fuel ratio. FIG. 16 illustrates an example of such modeling, which is the manifold fuel transport model of Japanese Pat. Kokoku Hei. 5-73908.

In FIG. 16, Gf denotes the amount of injected fuel, X denotes the fuel sticking rate, Mf denotes the liquid film amount that is the total amount of fuel that is sticking to the manifold wall and the like, τ denotes the evaporation time constant, and Gfe denotes the cylinder-flowing fuel amount that is the actual amount of fuel that flows into the cylinder. In this model, these variables and parameters are related in the following equations.

$$dMf/dt = -Mf/\tau + XGf$$

$$Gfe = Mf/\tau + (1-X)Gf$$

However, the evaporation time constant and the sticking rate are determined by a great number of complex factors such as the amount of the air passing through the manifold, the temperature of the manifold, the quality of fuel, and individual deviations. Therefore, it is hard to obtain the values of these parameters. For example, we must apply a method of creating a matrix data group of parameters by obtaining step responses to fuel input under various conditions of the running engine. Further, in order to match the model with an actual engine, it is necessary to minimize the deviations (errors) of simulated responses for the responses of the actual engine. Consequently, a great amount of time and a great number of modifications are necessary in order to implement the model to control the engine at a target air-fuel ratio.

As described above, prior approaches, using whether the PID control or a sticking-fuel model, must first determine the structure and parameters of the engine that affect air-fuel ratios. The data of the parameters must be obtained beforehand by experiments and simulation, and must be swapped depending on operating conditions. The experiments and simulation should be repeated and the amount of the data should be increased to control air-fuel ratios with great accuracy.

Apart from the sticking fuel, the following are among the factors for varying air-fuel ratios:

(1) A delay determined by a time delay between the detection time of the $O_2$ sensor or air-fuel ratio sensor and the injection time of the fuel.

(2) A delay due to electric processing of the intake air signal.

(3) A delay in detecting changes in throttle position.

(4) A control delay due to an acceleration judgment delay.

(5) A delay in mechanical opening of the injector and a delay in the fuel flow.

(6) A delay determined by a shift in fuel injection timing and by the timing of opening and closing the intake valve.

(7) Control deviations (errors) due to thermal response delays.

Therefore, the structure of the engine is complex, so that modeling is hard, and a great number of data maps are necessary. In particular, concerning the delay of (1), the transport lag between the exhaust valve and the location of the sensor is great, and the amount of the lag varies depending on operating conditions (the engine speed, the intake manifold pressure, and the like). Therefore, the dead time of the controlled system is time-dependent, so that performing the feedback control stably and accurately is very hard.

As an approach to resolve these difficulties, there is a neural network model that learns non-linear factors such as the fuel sticking of the engine to directly compute the amount of injected fuel. The aim of this approach is to shorten the time for adjusting the parameters and, at the same time, to improve the response characteristics in the transient state. However, accuracy in learning and universality in control performance are in a trade-off relation. In fact, the selection of data is hard to make the neural network learn for the whole operating range, and a huge size of a data group is necessary as a result. Further, the amount of injected fuel, which is the control input to the controlled system, is directly computed, so that the stability of the control system is not guaranteed. No logical method of changing the control characteristics is available in this model, except determining the values of control variables by trial and error of repetitive learning.

SUMMARY OF THE INVENTION

An object of the present invention is therefore to resolve, for air-fuel control using a neural network, difficulties in designing the structure of the control, complexities of algorithms, and elongated procedures of determining data for accuracy. Another object is to provide accurate air-fuel control systems that can easily alter control characteristics while guaranteeing the stability of the controlled object having dead time.

Another object is to prevent runaway and standstill of the engine due to a failure in sensors or disconnection of wiring.

A further object of the present invention is to control actual air-fuel ratios at a target air-fuel ratio with great accuracy even in an operating range where the accuracy of the neuro-estimates is low or the accuracy deteriorates.

A still further object of the present invention is to improve the accuracy of estimates by a neural network.

A still further object of the present invention is to control air-fuel ratios with great accuracy without using an air-fuel ratio sensor.

A still further object is to reduce the effects of a disturbance that is a purge amount of a canister.

In order to achieve the aforementioned objective of providing an accurate air-fuel ratio control system, the present invention makes a hierarchical neural network (abbreviated to NN hereafter) learn the non-linear structure of the control system to calculate the control amount using the output or connectivity coefficients of the NN.

Concerning vehicle control and more particularly engine control, for a controlled object having dead time between input and output such that the dead time varies depending on situations, a control system of the present invention comprises the following components in a vehicle or an engine.

A data sampling means (member) that samples an input data sequence from output data of various sensors containing the input and output values of the controlled object and at least one of values of parameters that become factors for dead time.

A teacher data generating means (member) that generate a teacher data sequence corresponding to each element in input data sequence by varying dead time depending on the values of parameters that become factors for dead time.

A connectivity-coefficients learning means (member) that learns characteristics of the controlled object having dead time to determine connectivity coefficients based on the input data sequence and the teacher data sequence.

A neuro-computing means (member) that estimates at a timing point k the output result having dead time and corresponding to the input given at the timing point k using the connectivity coefficients.

A control-amount calculating means (member) that calculates a control amount, based on the output of the neuro-computing means, as the feedback amount in place of the output obtained by the data sampling means.

Hereupon, the connectivity coefficients used by the neuro-computing means can also be calculated off-line.

In particular, in an air-fuel ratio control system, information about dead time is given to the NN during its learning, the control correction amount of injected fuel is calculated based on the output of the pre-trained NN. The basic injection amount of fuel is in this way corrected, so that the fluctuation of air-fuel ratios in the transient state is reduced, and the target air-fuel ratio can be attained. Specifically, the air-fuel ratio control system has the following base components.

A state detecting sensor group that detects an operating state of the internal combustion engine.

An air-amount detecting sensor group that detects an intake air amount.

An air-fuel ratio sensor that detects an air-fuel ratio of an exhaust gas of the engine.

A basic-fuel calculating means (member) that calculates a basic injection amount of fuel based on the output of the above sensor groups and a predetermined data group.

Further, the air-fuel ratio control system has the following components.

An air-fuel ratio storage means (member) that stores the past data detected by the air-fuel ratio sensor, renewing the storage at each control cycle with the newest n samples.

An injected-fuel amount storage means (member) that stores the past data of the fuel amount injected to each cylinder, renewing the storage at each control cycle with the newest m samples.

A conversion means (member) that converts each value of the data detected by the above sensor groups and each value stored by the above storage means into the data for an NN.

A forward neuro-computing means (member) that reads the input data given by the conversion means and performs in real time the neuro-computation of the pretrained NN to output an estimate $A/F_{NN}$ of the air-fuel ratio $A/F(k+n)$ detected at time k+n, where n is the time delay between the fuel injection at time k and the detection and varies with operating conditions.

A correction-amount calculating means (member) that calculates a control correction amount of injected fuel based on the output $A/F_{NN}$ of the forward neuro-computing means to make the air-fuel ratio $A/F(k+n)$ equal to a target air-fuel ratio.

A fuel injection means (member) that inject fuel to the engine according to the fuel amount obtained by adding the basic injection amount and the correction injection amount of fuel.

The present invention makes it possible to stably control a controlled object having dead time without selecting parameters of the mechanism of an internal combustion, without grasping factors affecting the selected parameters, and without obtaining experimental data of individual parameters. Further an engine model is described in terms of partial differential equations using the output of the NN and can be applied to the computation of control gain.

According to the above configuration, there is no dead time between outputting from the neuro-computing means and inputting to the controlled object. Therefore, stable and responsive control can be always achieved by using the neuro-output to calculate the control amount. Further, the forward neuro-computing means uses connectivity coefficients to output at time k an estimate of the air-fuel ratio for the fuel injected at time k, so that estimates of air-fuel ratios that incorporate time delays (dead time) can be obtained. Therefore, by using the estimates, the present invention can improve control performance in the transient state without constructing a complex control system for a controlled object having dead time.

Further, a control gain altering means (member) can change control gain depending on operating conditions, so that the present invention has good effects in improving stability and responsibility.

Further, a correction-amount calculating means (member) can be constructed so as to calculate the correction amount of injected fuel by feedback control for the deviation (error) e of the air-fuel estimate from a target air-fuel ratio and feed-forward control that uses multiple input values for the above NN. In this case, a gain adjusting means (member) adjusts on-line the gain of the feedback control and the feed-forward control using the connectivity coefficients, the intermediate-layer output, and the output-layer output of the NN. Therefore, the present invention can obtain the correction amount of injected fuel depending on operating conditions and particularly improve control performance in the transient state.

Still further, a backward neuro-computing means (member) can perform in real time the computation of an NN that outputs the correction amount of injected fuel so that actual air-fuel ratios become a target air-fuel ratio. Therefore, the present invention obviates the designing of a control system to reduce the number of development man-hours.

Further, a differential coefficients identifying means (member) obtains the parameters of an engine model based on the connectivity coefficients and the intermediate-layer output of the neuro-computing means. The differential coefficients identifying means in this way can obtain on-line the identification of a controlled object that varies depending on operating conditions. Based on this result, a correction-amount calculating means (member) can designs a stable control system around a current operating point using a linear control theory.

Still further, a control cycle altering means (member) and a control amount renewal means (member) can give an optimal control cycle depending on limitations of the NN and required computation time.

Further, an operating conditions judging means (member) and a correction permission means (member) can realize correction control in a small configuration, without using the neuro-data over the whole operating range.

Further, a pole calculating means (member) makes it possible to perform accurate control over the whole operating range by altering feedback gain to an optimal pole for each sub-range.

Further, the present invention provides the following means in order to prevent the runaway and standstill of the engine caused by a failure in a sensor or the disconnection of wire. An error judging means (member) can judge that an error has occurred by a failure in at least one of the sensors or the disconnection of wire, if the difference between the estimate of the air-fuel ratio calculated as the neuro-output and the output of the air-fuel ratio sensor has exceeded a pre-set value. In this case, a correction-stop signal generating means (member) issues a correction-stop signal to the correction-amount calculating means, which determines the correction amount to be zero.

Further, a correction-amount judging means (member) sets the correction amount at zero if the judgment result of a fuel cut-off state judging means (member) indicates the fuel cut-off state. If not, and if the air-fuel ratio detected by the air-fuel ratio sensor is below a pre-set air-fuel ratio, then the correction-amount judging means starts fuel correction using the output of the correction-amount calculating means. In this way, the present invention can get rid of useless fuel injection and smoothly perform correction control after a fuel cut-off.

Further, the present invention provides the following means in order to control actual air-fuel ratios at a target air-fuel ratio with great accuracy even in an operating range where the accuracy of neuro-estimates is low or the accuracy deteriorates. A correction-amount calculating means (member) can be constructed as a control system having the degree of freedom 2 and consisting of feedback control for the deviation e of the air-fuel ratio detected by an air-fuel ratio sensor from a target air-fuel ratio and feed-forward control for throttle position detected by a throttle position sensor to calculate the correction amount of injected fuel. In this way, even if the accuracy of estimates slightly deteriorates, actual air-fuel ratios can be kept at a target air-fuel ratio.

Still further, a filter processing means (member) applies a high pass filter to the feedback correction amount $\Delta G_{f1}$ calculated by a first correction-amount calculating means (member) using the estimate of the air-fuel ratio obtained as the neuro-output by the forward neuro-computing means. The filter processing means also applies a low pass filter to the feedback correction amount $G_{f2}$ calculated by a second correction-amount calculating means using the output of an air-fuel ratio sensor. Then the filter processing means adds the outputs of the two filters to obtain the actual correction amount. In this way, an air-fuel ratio control system of the present invention can perform feedback control for an air-fuel sensor in the stationary state and performs feedback control for estimates of air-fuel ratios in the transient state. Consequently, even if estimates have a stationary bias, actual air-fuel ratios become a target air-fuel ratio, so that the present invention can improve control performance in both stationary and transient states.

Still further, if a stationary-state judging means (member) judges that the current operating state is the stationary state, a threshold value revising means revises the threshold value in the output layer of the forward neuro-computing means based on the deviation e of an estimate of air-fuel ratios from the output of the air-fuel ratio sensor. Consequently, an air-fuel ratio control system of the present invention can revise on-line the deviation of an estimate of air-fuel ratios from the output of the air-fuel ratio sensor due to differences in individual vehicles and sensors or secular changes.

Further, if the stationary-state judging means judges that the current operating state is the stationary state, then a coefficients revising means (member) revises the connectivity coefficients and threshold values of the backward neuro-computing means using the deviation of the air-fuel ratio detected by the air-fuel ratio sensor from the target air-fuel ratio, where the deviation is obtained by an air-fuel ratio-error detection means (member). In this way, an air-fuel ratio control system of the present invention can maintain control performance, even if a stationary bias remains between actual air-fuel ratios and a target air-fuel ratio, or even if the neuro-output correction amount becomes inadequate by differences in individual vehicles and sensors or secular changes.

All the above configurations use an LAF sensor as an air-fuel ratio sensor, which provides data for neuro-input. However, among current air-fuel ratio control systems, there are few passenger cars that have an LAF sensor, and many current air-fuel control systems in passenger cars use an $O_2$ sensor that detects oxygen concentration in the exhaust gas. However the output of an $O_2$ sensor is two-valued, so that air-fuel ratios can not be obtained linearly. Consequently, it has been hard to construct an air-fuel ratio control system that accurately responses to a target air-fuel ratio. Therefore, the present invention designs an NN that learns beforehand from a teacher signal, which is the output of an LAF sensor, and input data created by the following means. An oxygen-concentration integrating means (member) that integrates the output of the $O_2$ sensor, and an oxygen-concentration differentiating means (member) that obtains the change amount in the output of the $O_2$ sensor. Then the outputs of the $O_2$ sensor, the oxygen-concentration integrating means, and the oxygen-concentration differentiating means are input to the input layer of the NN. Using this trained NN, an air-fuel ratio control system of the present invention can perform accurate air-fuel ratio control without using an expensive LAF.

Further, in order to improve the accuracy of neuro-estimates, the present invention provides the following means. An air-fuel ratio storage means (member) and an injected-fuel amount storage means (member) store the past data. An air-fuel ratio input-selection means (member) and injected-fuel-amount input-selection means (member) select input data for an NN from the past data. A high-order non-linear model can be represented by these means, so that the accuracy of neuro-estimates is improved. Further, a throttle position differentiating means (member), an intake-air-pressure differentiating means (member), an injected-fuel-amount differentiating means (member), and a data storage means (member) can additionally input the differentials of the detected values of the sensors to the input layer of an NN. The NN becomes to have expectation functions in this way, so that the accuracy of estimates for an air-fuel ratio control system having dead time can be improved.

Still further, in order to perform accurate air-fuel ratio control without using an air-fuel ratio sensor, the present invention provides the following means. An estimated-air-fuel ratio storage means (member) stores the estimates of air-fuel ratios output from an NN, renewing the storage at each control cycle with the newest n samples. The stored data is in turn input to the input layer of the NN. By this means, a neuro-computing means can calculate estimates of air-fuel ratios without using an air-fuel ratio sensor.

Still further, in order to reduce the effects of a disturbance that is the purge amount of the canister, the present invention provides the following means. A purge-amount estimating means (member) estimates the increase rate of the purge amount from the past k pieces of data, which is the estimated air-fuel ratios and the detected air-fuel ratios, respectively output from an NN and an air-fuel ratio sensor. A correction-amount calculating means (member) then adds a term that inversely revises the correction amount against the increase rate.

Further, a valve-state detecting means (member) detects the valve-opening-instruction time to additionally input it to the NN. Then the NN learns how the purge amount varies, depending on external environments, from the input and the teacher data obtained as the difference between the output of the air-fuel ratio sensor and the output of the NN that has learned during the time when purging is shut off. Then a purge-amount calculating means (member) calculates an estimated purge amount, and a correction-amount calculating means (member) revises the correction amount using the estimated purge amount, so that the effects of a disturbance that is the purge amount of the canister can be reduced.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 18 is a block diagram illustrating a sixth embodiment in accordance with the present invention;

FIG. 27 is a block diagram illustrating a tenth embodiment in accordance with the present invention; and FIG. 28 is a block diagram illustrating an eleventh embodiment in accordance with the present invention.

DETAILED DESCRIPTION OF THE PREFERRED EMBODIMENTS

The preferred embodiments according to the present invention will be described below with reference to the attached drawings.

First Embodiment

In vehicle control, particularly in engine control, if the controlled object has dead time between input and output, discrete system control becomes complex with the high order of the controlled object. Further, if the dead time significantly varies depending on operating conditions, good control performance can not be achieved by a single control system. However, the following configuration allows a single control system to give good performance, even if the dead time of an actual controlled system significantly varies.

Figure 1:
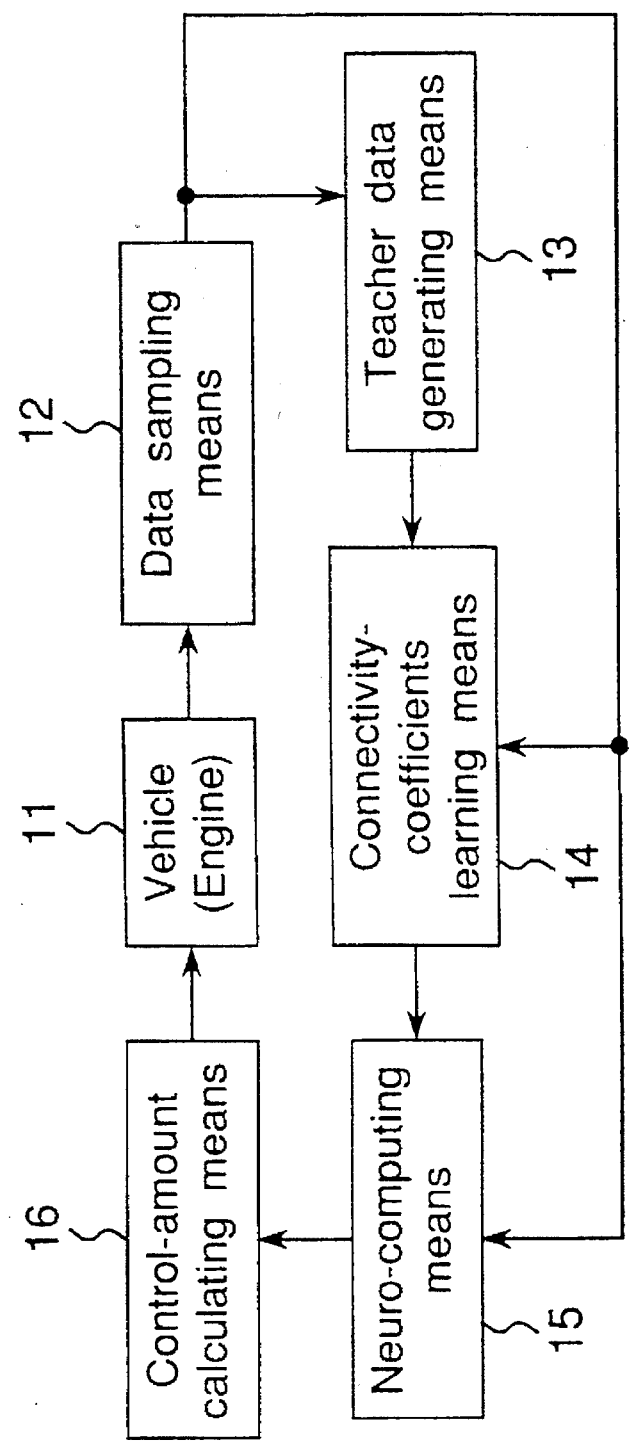
FIG. 1 is a block diagram illustrating a first embodiment in accordance with the present invention.

FIG. 1 is a block diagram illustrating the vehicle control system in a first embodiment in accordance with the present invention. The control system of the first embodiment comprises the following components in a vehicle or an engine 11.

A data sampling means (member) 12 that samples an input data sequence from the output data of various sensors containing the input and output values of the controlled object and the values of at least one parameter that becomes a factor for dead time.

A teacher data generating means (member) 13 that generates a teacher data sequence from the input data sequence sampled by data sampling means 12 by varying dead time depending on the value of parameters that become factors for dead time.

A connectivity-coefficients learning means (member) 14 that learns the characteristics of a controlled system having dead time to determine connectivity coefficients based on the input data sequence and the teacher data sequence.

A neuro-computing means (member) 15 that estimates at the timing point k the output result having dead time and corresponding to the input given at the timing point k using the connectivity coefficients.

A control-amount calculating means (member) 16 that calculates the control amount based on the output of neuro-computing means 15 as the feedback amount in place of the output to the controlled system obtained by data sampling means 12.

According to the above configuration, there is no dead time between outputting from the neuro-computing means 15 and inputting to the controlled system. Therefore, stable and responsive control can be always achieved by using the neuro-output to calculate the control amount.

Hereupon, the teacher data generating means 13 and the connectivity-coefficients learning means 14 may operate off-line using data sampled beforehand by the data sampling means 12 to calculate the connectivity coefficients for the neuro-computing means 15.

Second Embodiment

A case of vehicle control having dead time is air-fuel ratio control, which is described in the following. In the case of a multicylinder engine, accurate air-fuel ratio feedback control can be achieved, if an air-fuel ratio sensor is used for each cylinder. However, air-fuel ratio sensors are expensive, so that, in practice, a single air-fuel ratio sensor is installed for control at a location where exhaust gas of all cylinders get together. However, the value of the air-fuel ratio sensor in this case reflects the result of the mixed exhaust gas obtained from fuel injection and ignition in all cylinders. Further, great dead time exists owing to transport delays in manifolds and others. Therefore, separate control for each cylinder can not be performed using this output value except using estimates for each cylinder by observers. The same problem remains, when estimation for air-fuel ratios is performed by neural network. Consequently, in prior air-fuel control using a neural network, there has been a problem that estimates significantly deviates, and control performance deteriorates in the transient state as caused by rapid opening of the throttle. The following configuration of the present invention can improve the performance of the control in the transient state.

Figure 2:
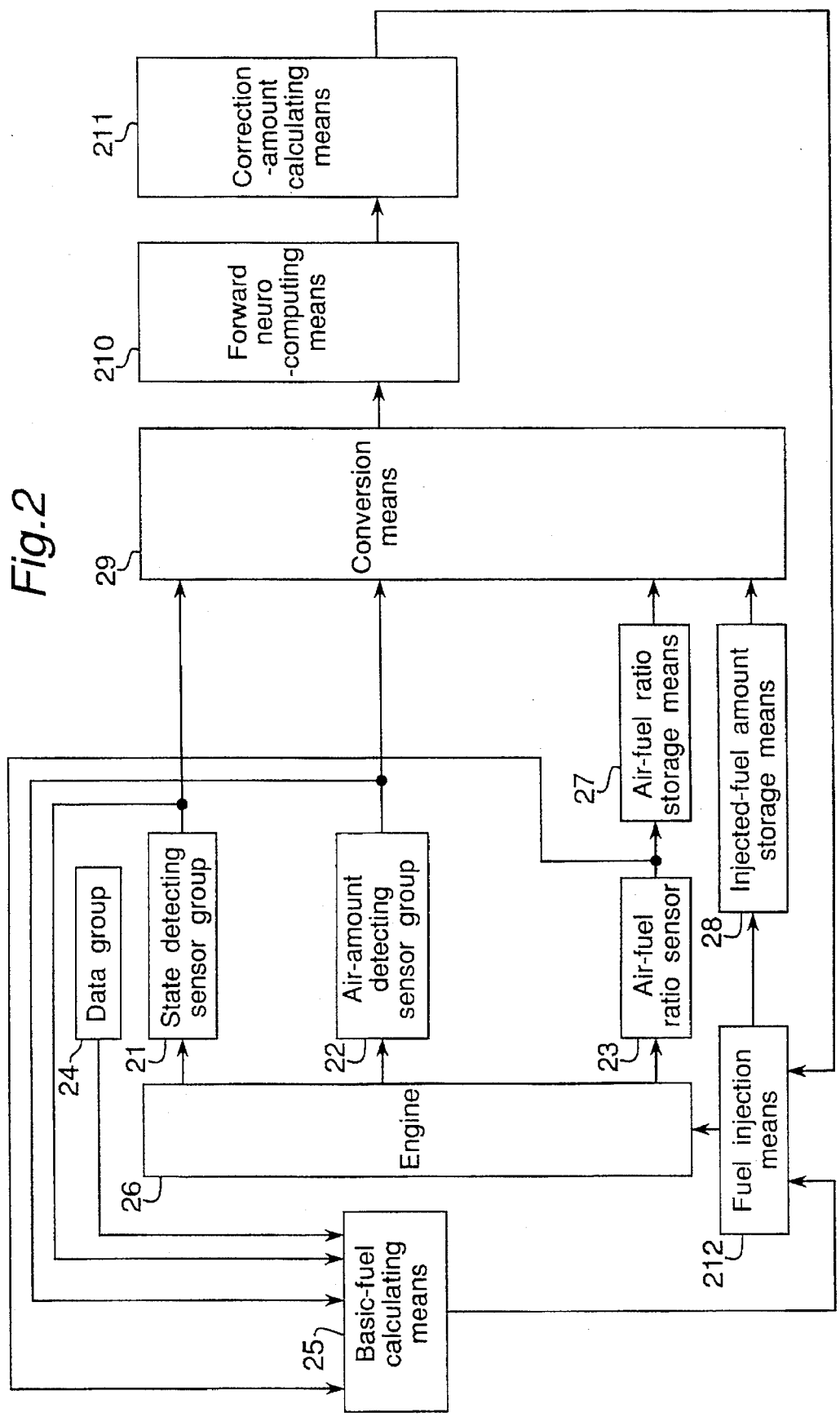
FIG. 2 is a block diagram illustrating a second embodiment in accordance with the present invention.

FIG. 2 is a block diagram illustrating a second embodiment in accordance with the present invention. The air-fuel ratio control system of the present embodiment has the following base components in an internal combustion engine 26.

A state detecting sensor group 21 that detects the operating state of the internal combustion engine 26.

An air-amount detecting sensor group 22 that detects the intake air amount.

An air-fuel ratio sensor 23 that detects the air-fuel ratio of the exhaust gas of the engine 26.

A basic-fuel calculating means (member) 25 that calculates the basic injection amount of fuel based on the output of the above sensor groups and a predetermined data group 24.

Further, the air-fuel ratio control system has the following components.

An air-fuel ratio storage means (member) 27 that stores the past data detected by the air-fuel ratio sensor 23, renewing the storage at each control cycle with the newest n samples.

An injected-fuel amount storage means (member) 28 that stores the past data of the fuel amount injected to each cylinder, renewing the storage at each control cycle with the newest m samples.

A conversion means (member) 29 that converts each value detected by the above sensor groups and each value of air-fuel ratios and injected-fuel amounts stored by the above storage means into input data for a neural network (abbreviated to NN hereafter).

A forward neuro-computing means (member) 210 that reads the input data given by the conversion means 29 and performs in real time the neuro-computation of the pre-trained NN to output at time k an estimate $A/F_{NN}$ of the air-fuel ratio A/F(k+n) detected at time k+n, where n is the time delay between fuel injection at time k and detection at time k+n and varies with operating conditions.

A correction-amount calculating means 211 (member) that calculates the correction amount of injected fuel based on the output $A/F_{NN}$ of the forward neuro-computing means 210 to make the air-fuel ratio A/F(k+n) equal to a target air-fuel ratio.

A fuel injection means (member) 212 that injects to the engine 26 the fuel amount obtained by adding the basic injection amount obtained by the basic-fuel calculating means 25 and the correction injection amount obtained by the correction-amount calculating means 211.

In the state detecting sensor group 21 that detects the operating state of the engine, there are a coolant temperature sensor and others. In the air-amount detecting sensor group 22 that detects the intake air amount, there are an engine speed detection sensor that detects engine speed, and an intake manifold pressure sensor that detects the pressure inside the intake manifold, and a sensor that directly detects the air amount.

The above NN represents an engine model that inputs the amount of injected fuel and outputs air-fuel ratios. The teacher data used during learning should be the values detected by the air-fuel ratio sensor corresponding to the fuel injected at time k.

Main factors for the delay (dead time) until the air-fuel ratio corresponding to injected fuel is detected are a transport delay in the exhaust manifold that lasts while the exhaust gas moves from the exhaust valves to the air-fuel gas sensor and a detection delay in the sensor. These delays are particularly affected by the fluctuations of engine speed and intake manifold pressure. Therefore, the values of these parameters are added to the input to the NN. The teacher data used during learning is obtained by shifting the air-fuel ratio data by a time period depending on these parameters. An estimate of air-fuel ratio corresponding to the fuel injected at time k can be obtained at time k as the output of the NN that has learned in this way.

The forward neuro-computing means 210 uses connectivity coefficients obtained by learning as described above, so that estimates of air-fuel ratios that incorporate time delays (dead time) can be obtained. Therefore, by using the estimates, the present invention can improve control performance in the transient state without constructing a complex control system for a controlled system having dead time.

The present invention can further improve the performance of air-fuel control by the following configuration.

Figure 3:
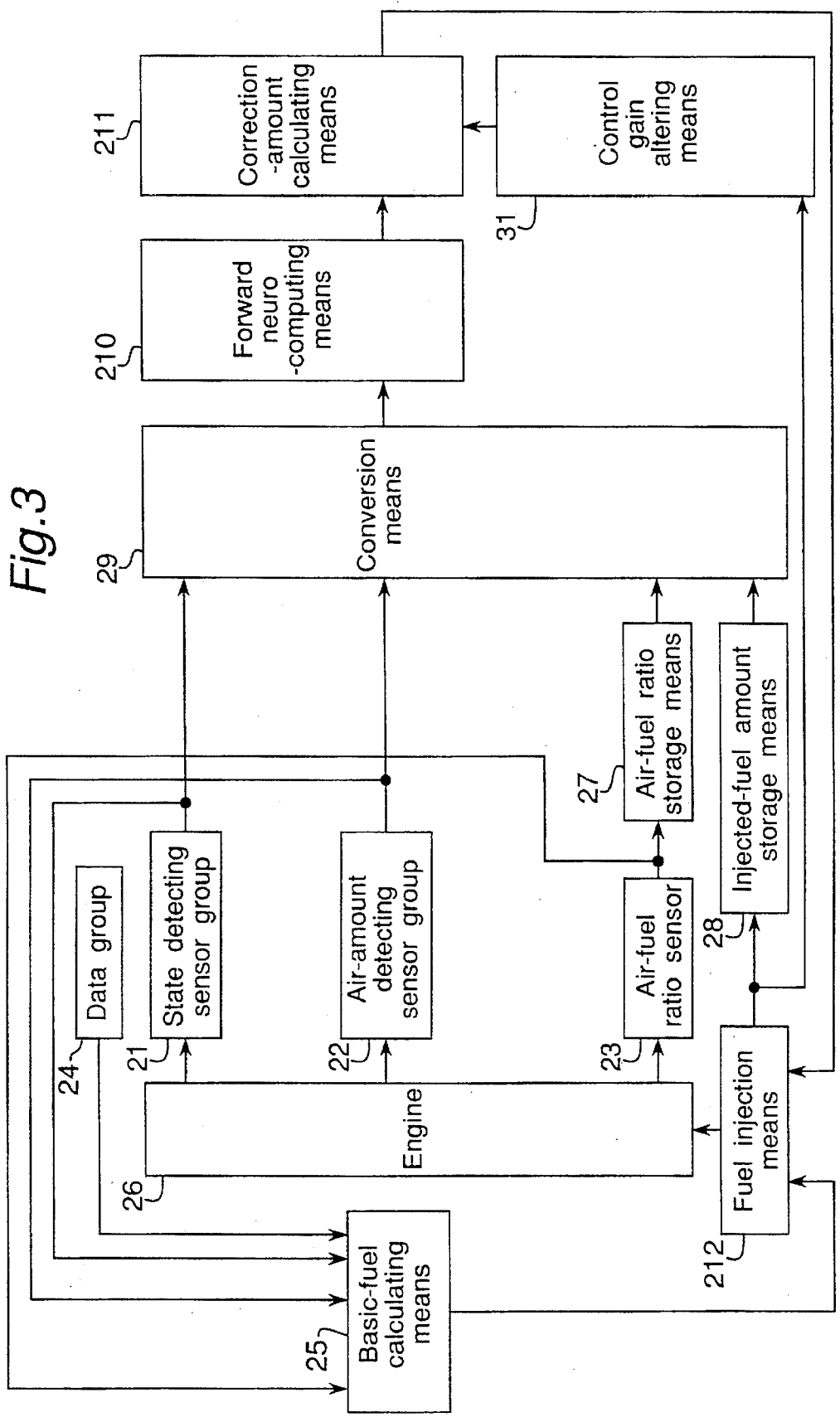
FIG. 3 is a block diagram illustrating another second embodiment in accordance with the present invention.

FIG. 3 is a block diagram illustrating another second embodiment in accordance with the present invention. The air-fuel ratio control system of the present embodiment has, a state detecting sensor group 21 that detects the operating state of an internal combustion engine 26, an air-amount detecting sensor group 22 that detects the intake air amount, an air-fuel ratio sensor 23 that detects the air-fuel ratio of the exhaust gas of the engine 26, and a basic-fuel calculating means (member) 25 that calculates the basic injection amount of fuel based on the output of the above sensor groups and a predetermined data group 24.

The air-fuel ratio control system has further, an air-fuel ratio storage means (member) 27 that stores the past data detected by the air-fuel ratio sensor 23, renewing the storage at each control cycle with the newest n samples, an injected-fuel amount storage means (member) 28 that stores the past data of the fuel amount injected to each cylinder, renewing the storage at each control cycle with the newest m samples, a conversion means (member) 29 that converts each value detected by the above sensor groups and each value of air-fuel ratios and injected-fuel amounts stored by the above storage means into input data for a neural network (abbreviated to NN), a forward neuro-computing means (member) 210 that reads the input data given by the conversion means 29 and performs in real time the neuro-computation of the pretrained NN to output an estimate $A/F_{NN}$ of the detected air-fuel ratio varying with a delay, a correction-amount calculating means (member) 211 that calculates the correction amount of injected fuel based on the output of the forward neuro-computing means 210 to make the detected air-fuel ratio equal to a target air-fuel ratio $A/F_{target}$, a fuel injection means (member) 212 that injects to the engine 26 the fuel amount obtained by adding the basic injection amount obtained by the basic-fuel calculating means 25 and the correction injection amount obtained by the correction-amount calculating means 211, and a control gain altering means (member) 31 that alters the control gain of the correction-amount calculating means 211 depending on the fuel injected by the fuel injection means 212.

Among methods of altering control gain by the control gain altering means 31 is shown in the following equation:

$$K \leftarrow Kc * Gf * (A/F_{NN} - A/F_{target})/A/F_{target}) \quad (1)$$

where K is the altered control gain, Kc is a constant, and Gf is the amount of injected fuel. Alternatively, the control gain altering means 31 may alter the gain depending on intake manifold pressure and/or the throttle angle. In this way the control gain altering means 31 can alter control gain depending on operating conditions, so that the present invention can improve stability and responsibility.

The present invention further improves the performance of air-fuel ratio control by the following configuration.

Figure 4:
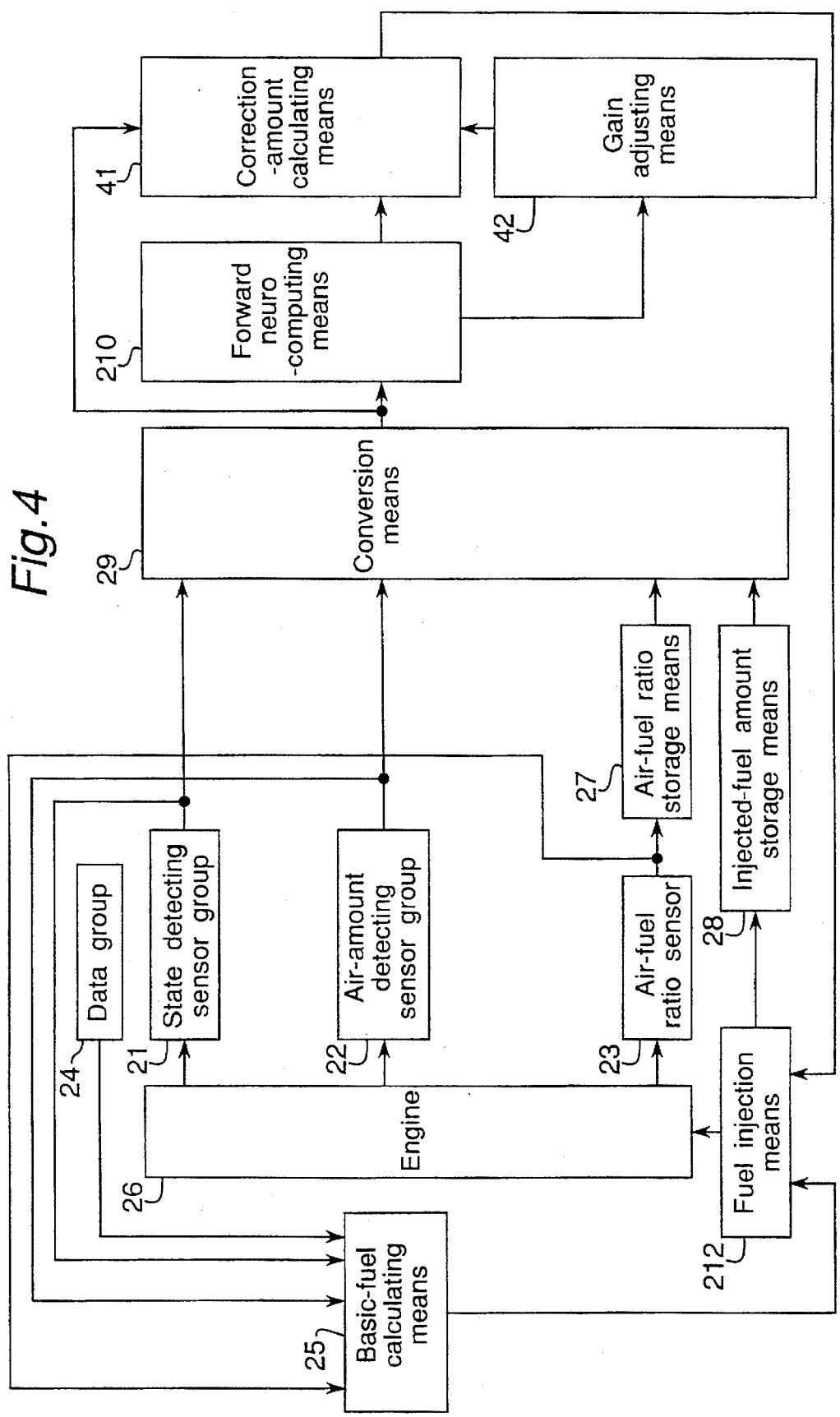
FIG. 4 is a block diagram illustrating another second embodiment in accordance with the present invention.

FIG. 4 is a block diagram illustrating another second embodiment in accordance with the present invention. The air-fuel control system of the present embodiment has, a state detecting sensor group 21 that detects the operating state of an internal combustion engine 26, an air-amount detecting sensor group 22 that detects the intake air amount, an air-fuel ratio sensor 23 that detects the air-fuel ratio of the exhaust gas of the engine 26, and a basic-fuel calculating means (member) 25 that calculates the basic injection amount of fuel based on the output of the above sensor groups and a predetermined data group 24.

The air-fuel ratio control system has further, an air-fuel ratio storage means (member) 27 that stores the past data detected by the air-fuel ratio sensor 23, renewing the storage at each control cycle with the newest n samples, an injected-fuel amount storage means (member) 28 that stores the past data of the fuel amount injected to each cylinder, renewing the storage at each control cycle with the newest m samples, a conversion means (member) 29 that converts each value detected by the above sensor groups and each value of air-fuel ratios and injected-fuel amounts stored by the above storage means into input data for a neural network (abbreviated to NN), a forward neuro-computing means (member) 210 that reads the input data given by the conversion means 29 and performs in real time the neuro-computation of the pre-trained NN to output an estimate $A/F_{NN}$ of the detected air-fuel ratio varying with a delay, a correction-amount calculating means (member) 41 that calculates the correction amount of injected fuel, to make the detected air-fuel ratio equal to a target air-fuel ratio, by feedback control for the deviation (error) e of the air-fuel estimate $A/F_{NN}$ from a target air-fuel ratio and feed-forward control that uses multiple input values for the NN, a fuel injection means (member) 212 that injects to the engine 26 the fuel amount obtained by adding the basic injection amount obtained by the basic-fuel calculating means 25 and the correction injection amount obtained by the correction-amount calculating means 41, and a gain adjusting means (member) 42 that adjusts on-line the gain of the feedback control and the gain of the feed-forward control using the connectivity coefficients, the intermediate-layer output, and the output-layer output of the NN.

By means of the correction-amount calculating means 41 and the gain adjusting means 42, which use feedback and feed-forward control, the present invention can obtain the correction amount of injected fuel depending on operating conditions and particularly improve control performance in the transient state. The correction-amount calculating means 41 and the gain adjusting means 42 are described in the following in more detail.

Generally, a model that represents the relation between the changes in injected fuel amounts and changes in air-fuel ratios is a high-order delay system. In the present case, the air-fuel ratio storage means 27 and the injected-fuel amount storage means 28 can implement the high-order non-linear model by inputting past data to the NN.

Figure 15:
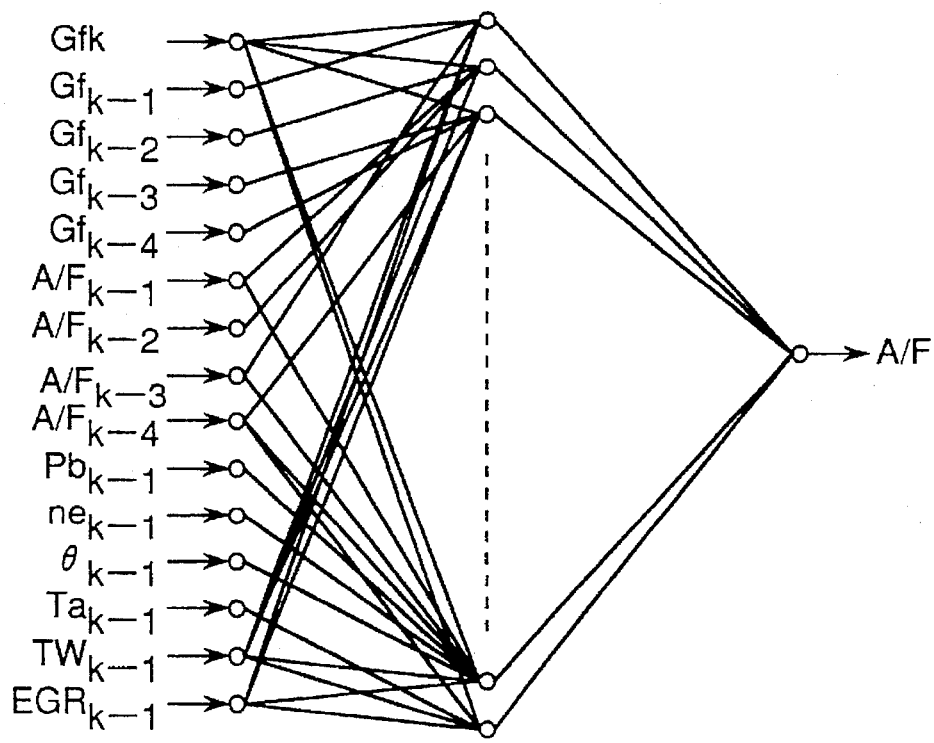
FIG. 15 shows the structure of the neural network used in the second and third embodiments of the present invention.
Figure 16:
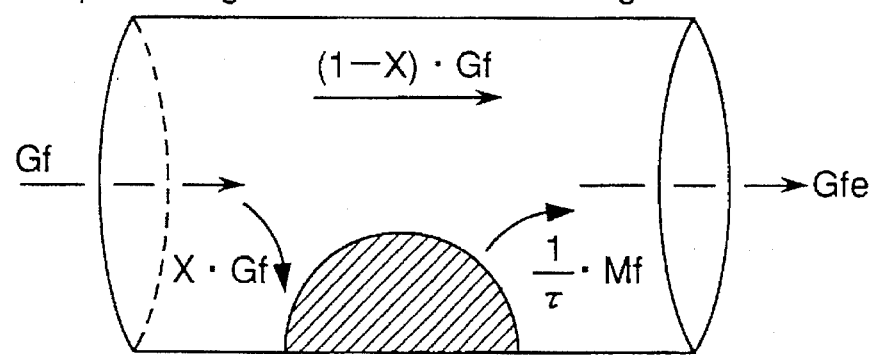
FIG. 16 is a conceptual diagram of a manifold-sticking-fuel model.

FIG. 15 shows the structure of the NN consisting of three layers: input layer, intermediate layer, and output layer, for a four cylinder engine. In FIG. 15, k is a value renewed at each control cycle, Gf is the amount of injected fuel, Pb is the pressure inside the manifold, and A/F is the air-fuel ratio.

Further, the forward neuro-computing means 210 constructs the structure of the NN that outputs air-fuel ratios, and the gain adjusting means 42 obtains parameters for the engine model that represents the relation between changes in injected fuel amounts and changes in air-fuel ratios, based on the connectivity coefficients, the output values of the intermediate layer, and the output values of the output layer of the NN. Then, the gain adjusting means 42 calculates control gain based on the parameters. In this way, a control system stable around the current operating point is constructed. For a method of calculating control gain, a system based on the linear control theory can be designed, an optimal regulator can be constructed, or a pole assigning method can be used.

The pre-trained NN of FIG. 15 can be regarded as a kind of non-linear function $f_{NN}$ that outputs air-fuel ratios $A/F_{NN}$. For example, $A/F_{NN}$ is given by the following equation, if the storage numbers n and m are respectively n=1 and m=2:

$$A/F_{NN}=f_{NN}(Gf_k, Gf_{k-1}, A/F_k, Pb_k), \quad (2)$$

where $Pb_k$ is regarded as a disturbance. Then the following input-output relation is obtained by total differentiation of $f_{NN}$:

$$\Delta A/F_{NN} = \partial f_{NN}/\partial Gf_k \cdot \Delta Gf_k + \partial f_{NN}/\partial Gf_{k-1} \cdot \Delta Gf_{k-1} + \quad (3)$$
$$\partial f_{NN}/\partial A/F_k \cdot \Delta A/F_k$$
$$= q \cdot \Delta Gf_k + q_1 \cdot \Delta Gf_{k-1} + p_1 \Delta A/F_k.$$

The differential coefficients $$q=\partial f_{NN}/\partial Gf_k, q_1=\partial f_{NN}/\partial Gf_{k-1}, P_1=\partial f_{NN}/\partial A/F_k,$$

in (3) can be obtained as follows.

Let the connectivity coefficients between the input and intermediate layers be Wij, and the connectivity coefficients between the intermediate and the output layers be $W_j$. Let the input variables to the input layer be $I_i$, and the output variables of the intermediate layer be $H_j$, and the output variable of the output layer be y (=$A/F_{NN}$). In this example, $I_1=Gf_k$, $I_2=Gf_{k-1}$, and $I_3=A/F_k$. Then the following equations are obtained:

$$H_j=f(U_j), U_j=\Sigma W_{ij} \cdot I_i - \theta_j,$$
$$y=f_{NN}=\Sigma W_j H_j - \theta, \quad (4)$$

where $\theta_j$ and $\theta$ are respectively the threshold values in the intermediate and output layers. The function f is a sigmoid function defined by $f(x)=1/(1+\exp(-x))$. Then the above partial differential coefficients, q, $q_1$, $p_1$ are obtained by the following equation:

$$\partial f_{NN}/\partial I_i = \Sigma(\partial y/\partial H_j) \cdot (\partial H_j/\partial U_j) \cdot (\partial U_j/\partial I_i) = \Sigma W_j H_j \cdot (1-H_j) \cdot W_{ij}. \quad (5)$$

The equation (3) can be discretized as follows. Let z be the shift operator defined by $$a_{k+1}=z \cdot a_k, \; a_{k+2}=z^2 \cdot a_k, a_{k-1}=z^{-1} \cdot a_k$$

for any time sequence ($a_k$).
Considering the ideal case, we assume $A/F_{k+1}=A/F_{NN}$. Then, $$\Delta A/F_{k+1}=q \cdot Gf_k+q_1 \cdot \Delta Gf_{k-1}+p_1 \cdot \Delta A/F_k,$$

that is, $$z \cdot \Delta A/F_k=q \cdot Gf_k+q_1 \cdot z^{-1} \cdot \Delta Gf_k+p_1 \Delta A/F_k.$$

Therefore, $$(z-p_1)\Delta A/F_k=(q+q_1 \cdot z^{-1}) \cdot \Delta Gf_k.$$

$$\Delta A/F_k=(q+q_1 \cdot z^{-1})/(z-p_1) \cdot \Delta Gf_k=(q \cdot z+q_1)/(z^2-p_1 \cdot z) \cdot \Delta Gf_k.$$

If $\Delta A/F_k$ is denoted by $\Delta A/F(z)$ and $\Delta Gf_k$ is denoted by $\Delta Gf(z)$, then $$\Delta A/F(z)=(q \cdot z+q_1)/(z^2-p_1 \cdot z) \cdot \Delta Gf(z). \quad (6)$$

This equation shows that air-fuel ratios are iteratively identified from the amounts of injected fuel. The feedback gain K and the correction amount are calculated using this equation.

We have regarded $Pb_k$ as a disturbance. However, it is a known disturbance input to the NN, so that it can be incorporated in the present control system. In this case, the following equation is derived from the equation (2) as the equation (6).

$$\Delta A/F(z) = (q \cdot z + q_1)/(z^2 - p_1 \cdot z) \cdot \Delta Gf(z) + \quad (7)$$
$$r \cdot z/(z^2 - p_1 \cdot z) \cdot \Delta Pb(z),$$

where $r=\partial f_{NN}/\partial Pb_k$, and $\Delta Pb(z)=\Delta Pb_k$. Therefore the following value is added to the correction amount as a disturbance canceling term:

$$\Delta g(z)=-r \cdot z/(q \cdot z+q_1) \cdot \Delta Pb(z). \quad (8)$$

The feedback gain K is calculated from the parameters p, q, $q_1$, and the correction amount of injected fuel $\Delta Gf(z)$ is given by the following equation:

$$\Delta Gf(z)=K \cdot (A/F_{NN}-A/F_{target}) -r \cdot z/(q \cdot z+q_1) \cdot \Delta Pb(z), \quad (9)$$

where $A/F_{NN}$ is the estimate of the air-fuel ratio, and $A/F_{target}$ is the target air-fuel ratio.

The above procedure is summarized as follows. The parameters q, $q_1$, $p_1$, r are successively calculated by the forward-neuro-computing means 210 and the gain adjusting means 42. The feedback gain K that stabilizes the control system and depends on operating conditions is calculated using the parameters q, $q_1$, and $p_1$. The correction amount of injected fuel is calculated by the correction-amount calculating means 211 following the equation (9).

Further the present invention can improve the performance of air-fuel ratio control by the following configuration.

Figure 5:
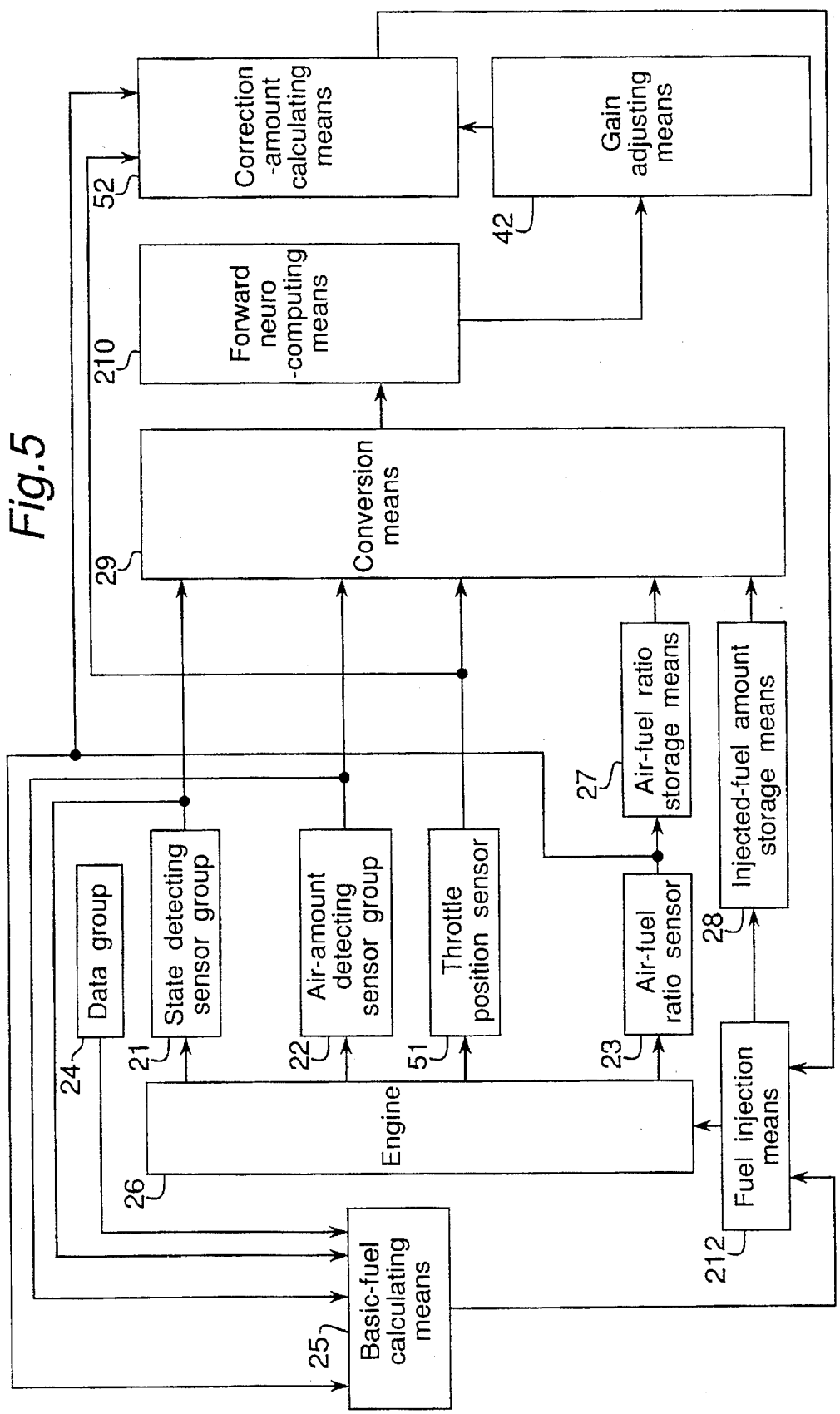
FIG. 5 is a block diagram illustrating another second embodiment in accordance with the present invention.

FIG. 5 is a block diagram illustrating another second embodiment in accordance with the present invention. The air-fuel ratio control system of the present embodiment has, a state detecting sensor group 21 that detects the operating state of an internal combustion engine 26, an air-amount detecting sensor group 22 that detects the intake air amount, an air-fuel ratio sensor 23 that detects the air-fuel ratio of the exhaust gas of engine 26, and a basic-fuel calculating means (member) 25 that calculates the basic injection amount of fuel based on the output of the above sensor groups and a predetermined data group 24.

The air-fuel ratio control system has further, an air-fuel ratio storage means (member) 27 that stores the past data detected by air-fuel ratio sensor 23, renewing the storage at each control cycle with the newest n samples, an injected-fuel amount storage means (member) 28 that stores the past data of the fuel amount injected to each cylinder, renewing the storage at each control cycle with the newest m samples, a conversion means (member) 29 that converts each value detected by the above sensor groups and each value of air-fuel ratios and injected-fuel amounts stored by the above storage means into input data for a neural network (abbreviated to NN), a forward neuro-computing means (member) 210 that reads the input data given by the conversion means 29 and performs in real time the neuro-computation of the pre-trained NN to output an estimate of the detected air-fuel ratio varying with a delay, a correction-amount calculating means (member) 52 that calculates the correction amount of injected fuel, to make the detected air-fuel ratio equal to a target air-fuel ratio, by the control rules for a degree-of-freedom-2 control system consisting of feedback control for the deviation (error) e of the air-fuel ratio detected by the air-fuel ratio sensor 23 from a target air-fuel ratio and feed-forward control for the throttle valve angle detected by a throttle position sensor 51, a fuel injection means (member) 212 that injects to the engine 26 the fuel amount obtained by adding the correction amount obtained by the correction-amount calculating means 52 to the basic injection amount obtained by the basic-fuel calculating means 25, and a gain adjusting means (member) 42 that adjusts on-line the gain of the feedback control and the gain of the feed-forward control using the connectivity coefficients, the intermediate-layer output, and the output-layer output of the NN.

The correction-amount calculating means 52 is constructed as a control system having the degree of freedom 2 and consisting of feedback control for the deviation e of the air-fuel ratio detected by the air-fuel ratio sensor 23 from a target air-fuel ratio and feed-forward control for the throttle valve angle detected by the throttle position sensor 51 to calculate the correction amount of injected fuel. In this way, even if the accuracy of estimates slightly deteriorates, actual air-fuel ratios can be kept at a target air-fuel ratio.

The correction-amount calculating means 52 calculates the correction amount $\Delta Gf(z)$, for example, by the following equation:

$$\Delta Gf(z) = K \cdot (A/F(z) - A/F_{target}) - r_1 \cdot z/(q \cdot z + q_1) \cdot \Delta\theta(z), \qquad (10)$$

where, $\Delta\theta$ is the change in the throttle valve angle, $r_1$ is the partial differential coefficient with respect to the change in the throttle valve angle given by the equations (4) and (5).

In a control system directly using the output of an NN as described above, if one of the sensors feeding data to the NN is broken, or if the wire connecting them is cut, then the input data becomes irrelevant and hence the output of the NN becomes absurd. Therefore, by means of the following means, the present invention can prevent excessive fuel injection or a standstill of the engine.

Figure 6:
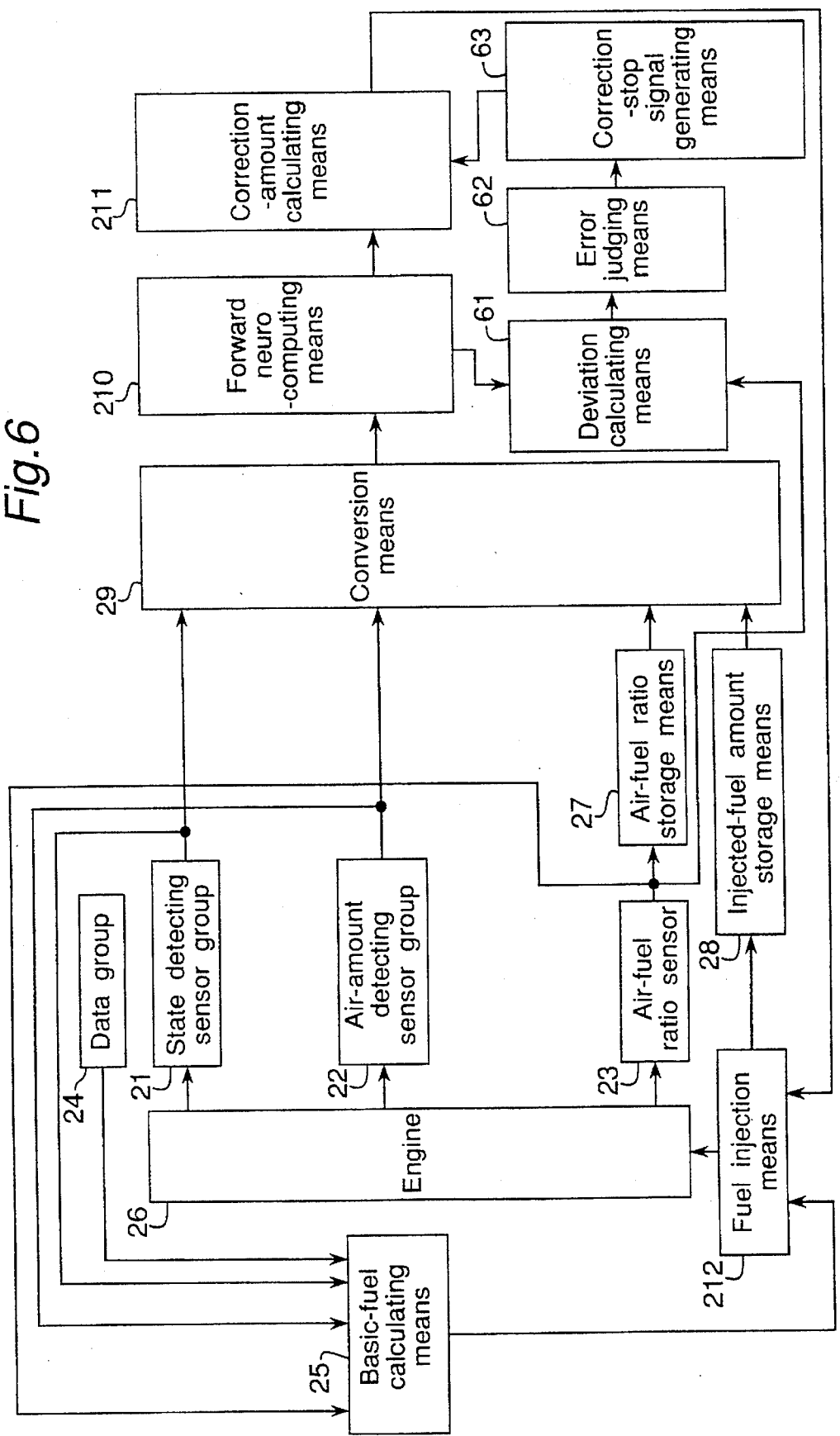
FIG. 6 is a block diagram illustrating another second embodiment in accordance with the present invention.

FIG. 6 is a block diagram illustrating another second embodiment in accordance with the present invention. The air-fuel ratio control system of the present embodiment has, a state detecting sensor group 21 that detects the operating state of an internal combustion engine 26, an air-amount detecting sensor group 22 that detects the intake air amount, an air-fuel ratio sensor 23 that detects the air-fuel ratio of the exhaust gas of the engine 26, and a basic-fuel calculating means (member) 25 that calculates the basic injection amount of fuel based on the output of the above sensor groups and a predetermined data group 24.

The air-fuel ratio control system has further, an air-fuel ratio storage means (member) 27 that stores the past data detected by the air-fuel ratio sensor 23, renewing the storage at each control cycle with the newest n samples, an injected-fuel amount storage means (member) 28 that stores the past data of the fuel amount injected to each cylinder, renewing the storage at each control cycle with the newest m samples, a conversion means (member) 29 that converts each value detected by the above sensor groups and each value of air-fuel ratios and injected-fuel amounts stored by the above storage means into input data for a neural network (abbreviated to NN), a forward neuro-computing means (member) 210 that reads the input data given by the conversion means 29 and performs in real time the neuro-computation of the pre-trained NN to output an estimate of the detected air-fuel ratio varying with a delay, a correction-amount calculating means (member) 211 that calculates the correction amount of injected fuel based on the output of the forward neuro-computing means 210 to make the detected air-fuel ratio equal to a target air-fuel ratio, a fuel injection means (member) 212 that injects to engine 26 the fuel amount obtained by adding the basic injection amount obtained by the basic-fuel calculating means 25 and the correction injection amount obtained by the correction-amount calculating means 211, a deviation calculating means (member) 61 that calculates the deviation of the air-fuel ratio estimate $A/F_{NN}$ of the NN from the air-fuel ratio detected by the air-fuel ratio sensor 23, an error judging means (member) 62 that judges that an error has occurred due to a failure in a sensor or disconnection of wiring, if the absolute value of the deviation output from the deviation calculating means 61 has exceeded a pre-set value, and a correction-stop signal generating means (member) 63 that issues a correction-stop signal to the correction-amount calculating means 211, which then determines the correction amount to be zero.

Specifically, the error judging means 62 can judge that an error has occurred due to a failure in at least one sensor feeding the NN or disconnection of wiring, if the absolute value of the deviation output from deviation calculating means 61 has exceeded 1.

Alternatively, the error judging means 62 can judge that an error has occurred, if the absolute value of the deviation output from the deviation calculating means 61 has exceeded a pre-set value for consecutive T msec. In this way the present invention can prevent the runaway and standstill of the engine.

Further, it is necessary to stop the correction of fuel-injection during a fuel cut-off and resume the correction after the termination of the fuel cut-off. The present invention allows a smooth transition between these states by the following configuration.

Figure 7:
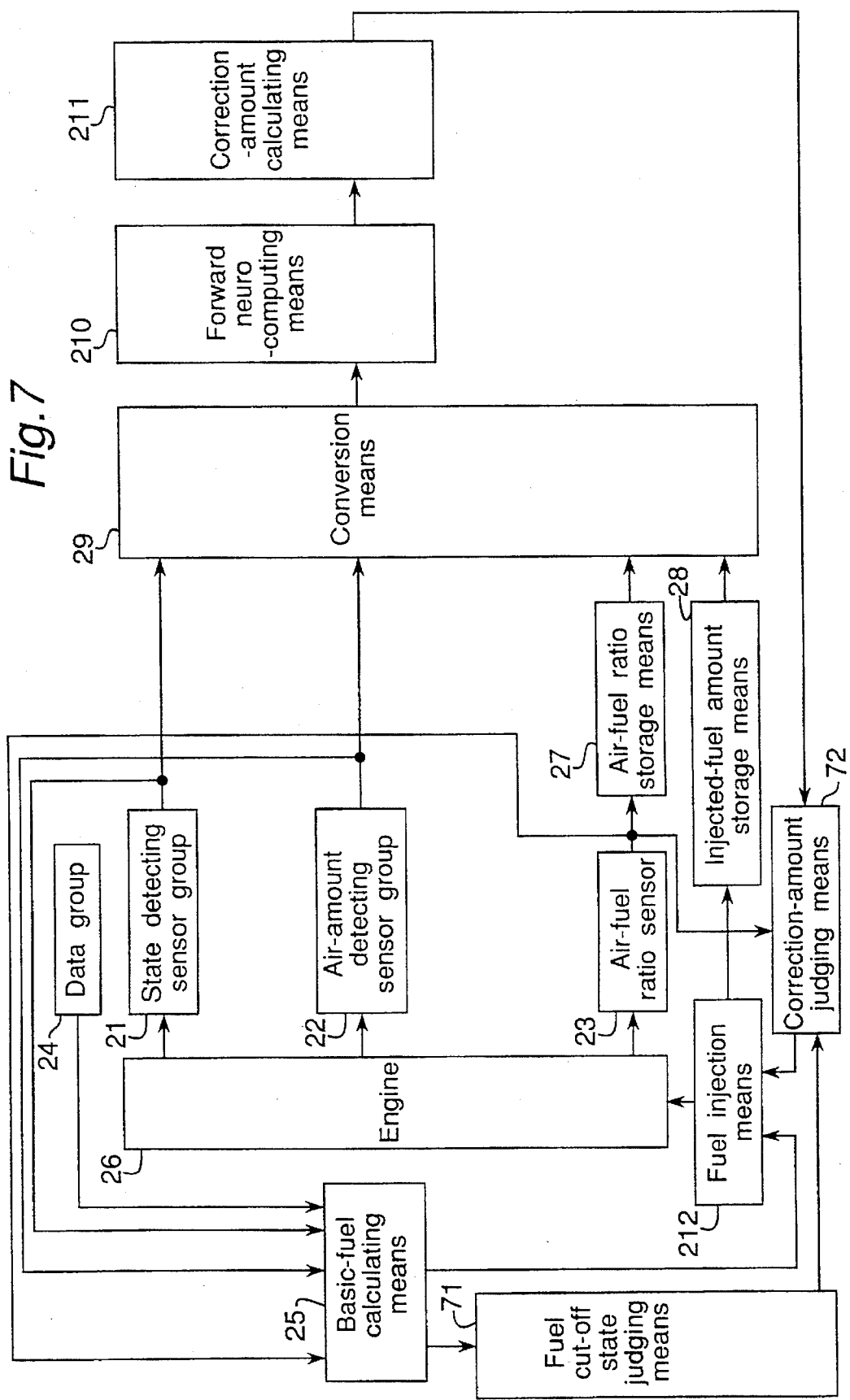
FIG. 7 is a block diagram illustrating another second embodiment in accordance with the present invention.

FIG. 7 is a block diagram illustrating another second embodiment in accordance with the present invention. The air-fuel ratio control system of the present embodiment has, a state detecting sensor group 21 that detects the operating state of the internal combustion engine 26, an air-amount detecting sensor group 22 that detects the intake air amount, an air-fuel ratio sensor 23 that detects the air-fuel ratio of the exhaust gas of the engine 26, a basic-fuel calculating means (member) 25 that calculates the basic injection amount of fuel based on the output of the above sensor groups and a predetermined data group 24, an air-fuel ratio storage means (member) 27 that stores the past data detected by air-fuel ratio sensor 23, renewing the storage at each control cycle with the newest n samples, an injected-fuel amount storage means (member) 28 that stores the past data of the fuel amount injected to each cylinder, renewing the storage at each control cycle with the newest m samples, a conversion means (member) 29 that converts each value detected by the above sensor groups and each value of air-fuel ratios and injected-fuel amounts stored by the above storage means into input data for a neural network (abbreviated to NN), a forward neuro-computing means (member) 210 that reads the input data given by the conversion means 29 and performs in real time the neuro-computation of the pre-trained NN to output an estimate of the detected air-fuel ratio varying with a delay, a correction-amount calculating means (member) 211 that calculates the correction amount of injected fuel based on the output of the forward neuro-computing means 210 to make the detected air-fuel ratio equal to a target air-fuel ratio, a fuel injection means (member) 212 that injects to the engine 26 the fuel amount obtained by adding the basic injection amount obtained by the basic-fuel calculating means 25 and the correction injection amount obtained by the correction-amount calculating means 211, a fuel cut-off state judging means (member) 71 that judges whether the current operating state is the fuel cut-off state or not, and a correction-amount judging means (member) 72 that sets the correction amount at zero, if the judgment result of the fuel cut-off state judging means 71 indicates the fuel cut-off state.

If the operating state recovers from the fuel cut-off state, and if the air-fuel ratio detected by the air-fuel ratio sensor is below a pre-set air-fuel ratio, then the correction-amount judging means 72 sets the correction amount at the output level of the correction-amount calculating means 211. For example, the correction-amount judging means 72 sets the correction amount at the output level of the correction-amount calculating means 211, if the operating state recovers from the fuel cut-off state, and if the air-fuel ratio detected by the air-fuel ratio sensor is within 2 of a target air-fuel ratio. For example, if a target air-fuel ratio is the theoretically optimal air-fuel ratio 14.7, then the fuel injection means 212 uses the output of the correction-amount calculating means 211. In this way, the present invention can get rid of useless fuel injection and smoothly perform correction control after a fuel cut-off.

If the deviation (error) of an air-fuel ratio estimate, which is the output of an NN, from a target air-fuel ratio is directly fed back to the input of an air-fuel ratio control system, then actual air-fuel ratios do not always become the target air-fuel ratio, even if the estimated air-fuel ratio becomes the same as the target ratio. This case occurs when the estimated ratio has a small stationary bias. Therefore, the present invention provides the following configuration to make actual air-fuel ratios equal to a target air-fuel ratio.

Figure 8:
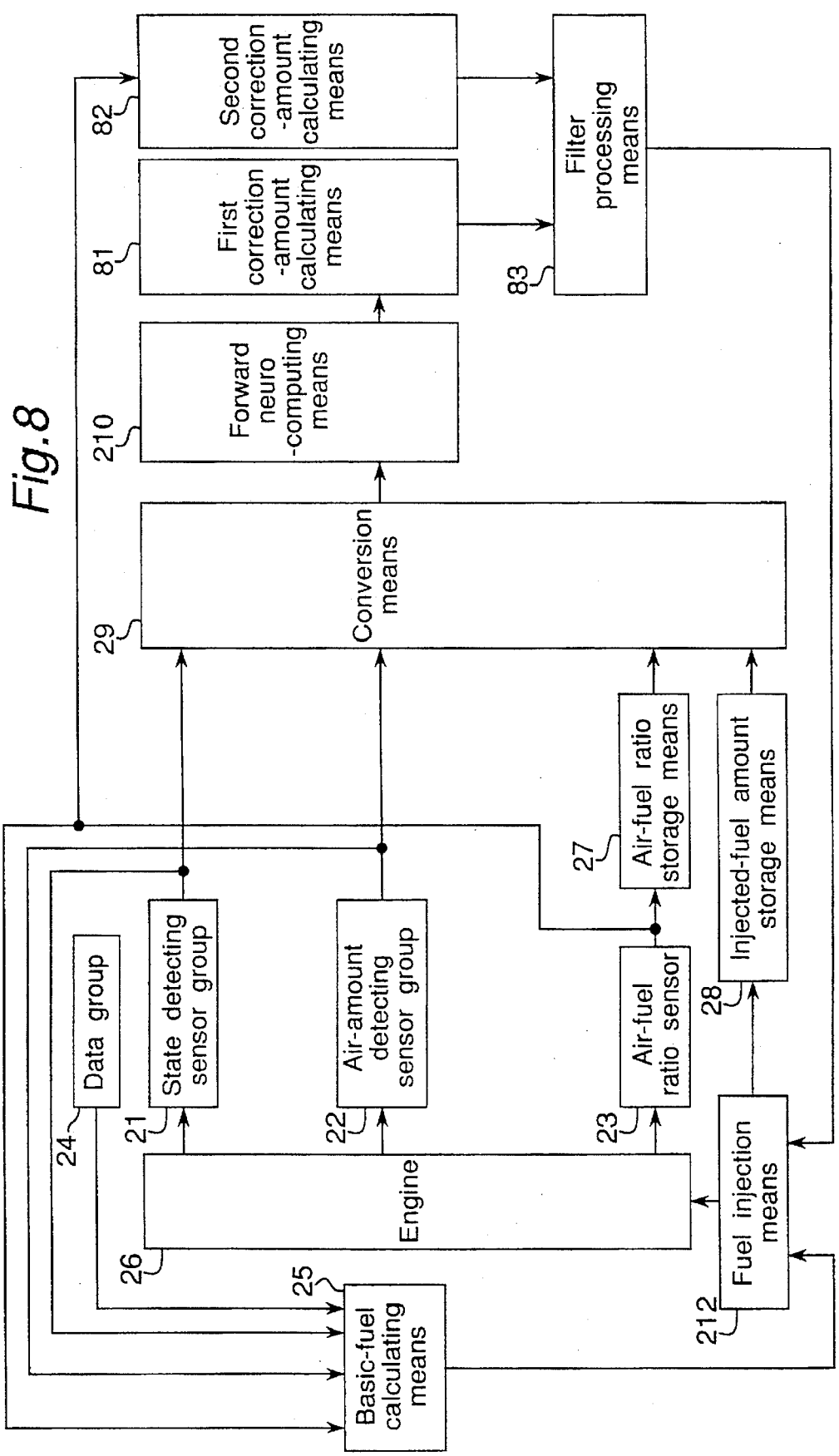
FIG. 8 is a block diagram illustrating another second embodiment in accordance with the present invention.

FIG. 8 is a block diagram illustrating another second embodiment in accordance with the present invention. The air-fuel ratio control system of the present embodiment has, a state detecting sensor group 21 that detects the operating state of the internal combustion engine 26, an air-amount detecting sensor group 22 that detects the intake air amount, an air-fuel ratio sensor 23 that detects the air-fuel ratio of the exhaust gas of the engine 26, a basic-fuel calculating means (member) 25 that calculates the basic injection amount of fuel based on the output of the above sensor groups and a predetermined data group 24, an air-fuel ratio storage means (member) 27 that stores the past data detected by the air-fuel ratio sensor 23, renewing the storage at each control cycle with the newest n samples, an injected-fuel amount storage means (member) 28 that stores the past data of the fuel amount injected to each cylinder, renewing the storage at each control cycle with the newest m samples, a conversion means (member) 29 that converts each value detected by the above sensor groups and each value of air-fuel ratios and injected-fuel amounts stored by the above storage means into input data for a neural network (abbreviated to NN), a forward neuro-computing means (member) 210 that reads the input data given by the conversion means 29 and performs in real time the neuro-computation of the pre-trained NN to output an estimate of the detected air-fuel ratio varying with a delay, a first correction-amount calculating means (member) 81 that calculates a correction amount of injected fuel based on the output of the forward neuro-computing means 210 to make the detected air-fuel ratio equal to a target air-fuel ratio, a second correction-amount calculating means (member) 82 that calculates a correction amount of injected fuel by feedback of the deviation (error) of the output of the air-fuel ratio sensor 23 from a target air-fuel ratio, a filter processing means (member) 83 that applies a high pass filter to the output of the first correction-amount calculating means 81 and apply a low pass filter to the output of the second correction-amount calculating means 82 to make the added two results the correction injection amount of fuel, and a fuel injection means (member) 212 that injects to the engine 26 the fuel amount obtained by adding the basic injection amount obtained by the basic-fuel calculating means 25 and the correction amount obtained by the filter processing means 83.

Let $\Delta Gf1$ denote the output of the first correction-amount calculating means 81, that is, the correction amount obtained by the feedback of air-fuel ratio estimates output from the NN. Let $\Delta Gf2$ denote the output of the second correction-amount calculating means 82, that is, the correction amount obtained by the feedback of air-fuel ratios detected by the air-fuel ratio sensor. Then the filter processing means 83 performs the following computation:

$$\Delta Gf = (b-b \cdot z^{-1})/(a+b+(a-b) \cdot z^{-1}) \cdot \Delta Gf1 + (a+a \cdot z^{-1})/(a+b+(a-b) \cdot z^{-1}) \cdot \Delta Gf2, \qquad (11)$$

where a and b are constants determined by the sampling period and cut-off frequency. For example, the value 0.1 Hz can be used as the cut-off frequency.

By the above configuration, the air-fuel ratio control system of the present embodiment performs feedback control for the air-fuel sensor in the stationary state and performs feedback control using the estimates of air-fuel ratios in the transient state. Consequently, even if estimates have a stationary bias, actual air-fuel ratios become a target air-fuel ratio, so that the present invention can improve control performance in both stationary and transient states.

Hereupon, instead of a fixed-value cutoff frequency, the cut-off frequency may be varied depending on operating conditions. For example, the cut-off frequency may be set at some low frequency when the engine speed is low, and set at some high frequency when the engine speed is high. Further, the cut-off frequency may be different for two filters. However, the cut-off frequency of the low pass filter should be always set lower or equal than the cut-off frequency of the high pass filter.

There is a problem that air fuel-ratio estimates output from the NN deviate from the output of the air-fuel ratio sensor by individual differences in vehicles and sensors. Therefore, the present invention revises on-line the output of the NN by the following configuration.

Figure 9:
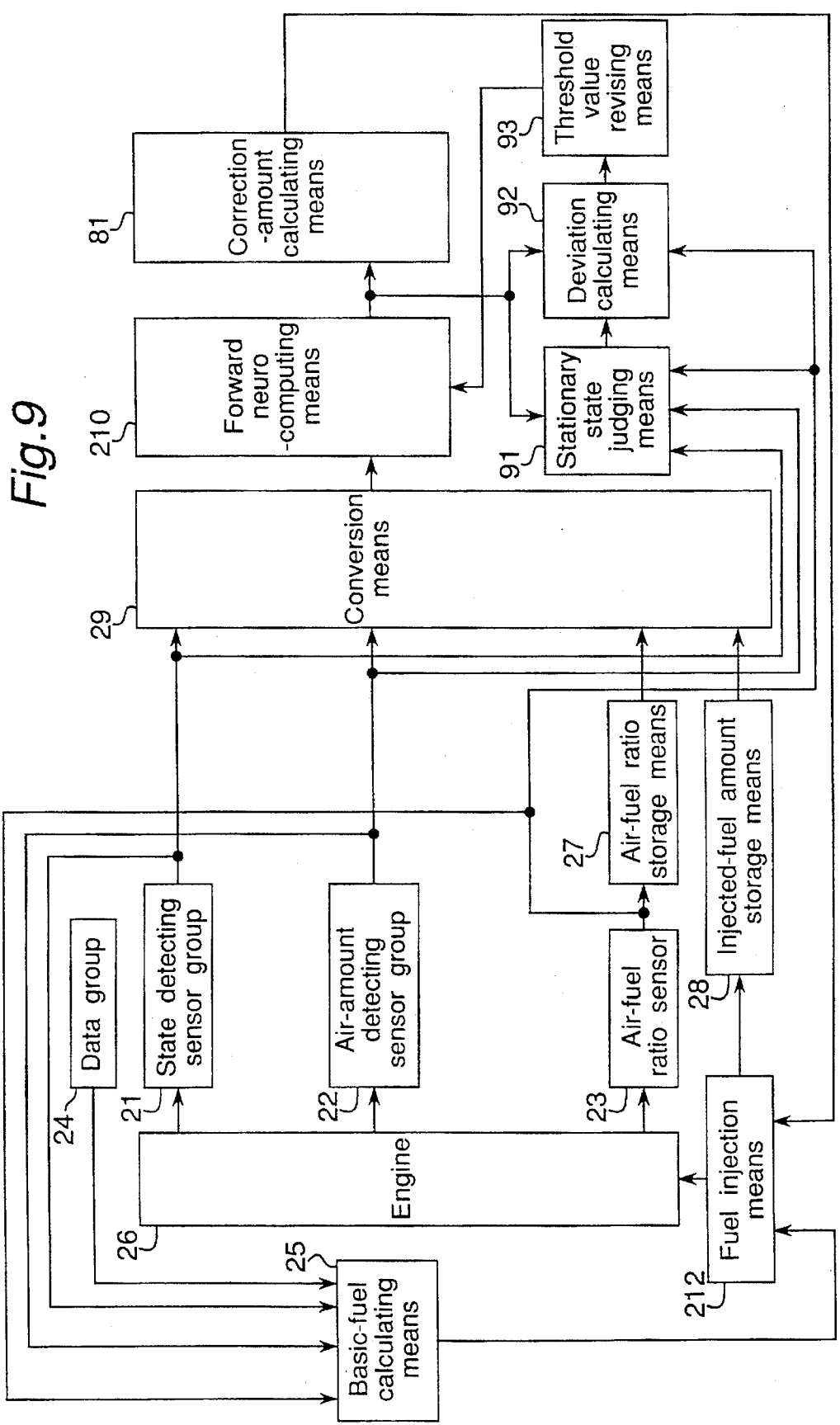
FIG. 9 is a block diagram illustrating another second embodiment in accordance with the present invention.

FIG. 9 is a block diagram illustrating another second embodiment in accordance with the present invention. The air-fuel ratio control system of the present embodiment has, a state detecting sensor group 21 that detects the operating state of the internal combustion engine 26, an air-amount detecting sensor group 22 that detects the intake air amount, an air-fuel ratio sensor 23 that detects the air-fuel ratio of the exhaust gas of the engine 26, a basic-fuel calculating means (member) 25 that calculates the basic injection amount of fuel based on the output of the above sensor groups and a predetermined data group 24, an air-fuel ratio storage means (member) 27 that stores the past data detected by the air-fuel ratio sensor 23, renewing the storage at each control cycle with the newest n samples, an injected-fuel amount storage means (member) 28 that stores the past data of the fuel amount injected to each cylinder, renewing the storage at each control cycle with the newest m samples, a conversion means (member) 29 that converts each value detected by the above sensor groups and each value of air-fuel ratios and injected-fuel amounts stored by the above storage means into input data for a neural network (abbreviated to NN), a forward neuro-computing means (member) 210 that reads the input data given by the conversion means 29 and performs in real time the neuro-computation of the pre-trained NN to output an estimate $A/F_{NN}$ of the detected air-fuel ratio varying with a delay, an error calculating means (member) 92 that calculates the deviation (error) e of the air-fuel ratio estimate $A/F_{NN}$ of the NN from the air-fuel ratio detected by the air-fuel ratio sensor 23, a stationary state judging means (member) 91 that judges whether the operating state is the stationary state or not, based on the past record of the rate of change in the output of one of the sensors or the NN, a threshold value revising means (member) 93 that revises, in the transient state, the threshold value in the output layer of the forward neuro-computing means 210 based on the deviation (error) e obtained by the deviation calculating means 92, a correction-amount calculating means (member) 211 that calculates the correction amount of injected fuel based on the output of the forward neuro-computing means 210 to make the detected air-fuel ratio equal to a target air-fuel ratio, and a fuel injection means (member) 212 that injects to the engine 26 the fuel amount obtained by adding the basic injection amount obtained by the basic-fuel calculating means 25 and the correction amount obtained by the correction-amount calculating means 211.

For example, the stationary state judging means 91 judges that the operating state is the stationary state, if the average of the past consecutive k absolute values of the rate of change in $\Delta A/F_{NN}$ output from the NN is below 0.1. Hereupon, the past consecutive k absolute values of the rate of change in the output from one of the sensors can be used instead. Alternatively the stationary judging means 91 may judge that the operating state is the stationary state, if the absolute values of the rate of change output from multiple sensors are at the same time below a pre-set value.

When the operating state is judged to be the stationary state by the stationary-state judging means 91, the threshold value revising means 93 revises the threshold value in the output layer of the forward neuro-computing means 210 based on the deviation e of an estimate of an air-fuel ratio from the output of the air-fuel ratio sensor. For example, if the deviation is positive, that is, the air-fuel ratio estimate is greater (the lean side) than the detected air-fuel ratio, then the threshold value of the output layer is increased so that the value input to the function, e.g. a tangent sigmoid function, of the output layer is reduced. In this way, the air-fuel-ratio estimate output from the NN becomes smaller (the rich side), and the deviation is made to decrease. If, on the other hand, the deviation e is negative, then the threshold value of the output layer is reduced.

Consequently, the air-fuel ratio control system of the present embodiment can revise on-line the deviation of estimated air-fuel ratios from the output of the air-fuel ratio sensor due to differences in individual vehicles and sensors or secular changes.

Third Embodiment

Next, a configuration that gives equivalent control performance without using an air-fuel ratio sensor is described.

Figure 10:
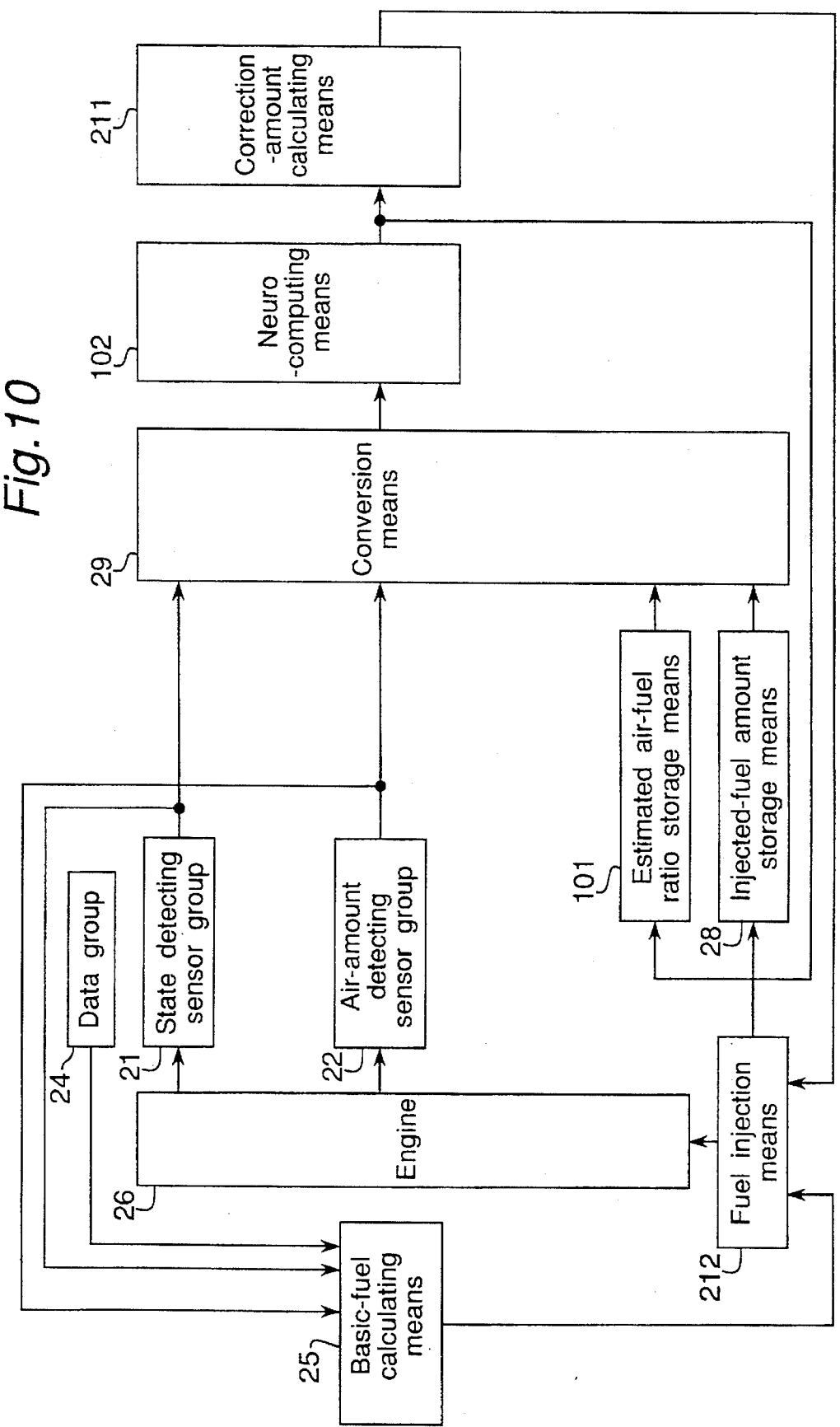
FIG. 10 is a block diagram illustrating a third embodiment in accordance with the present invention.

FIG. 10 is a block diagram illustrating a third embodiment in accordance with the present invention. The air-fuel ratio control system of the present embodiment has, a state detecting sensor group 21 that detects the operating state of an internal combustion engine 26, an air-amount detecting sensor group 22 that detects the intake air amount, and a basic-fuel calculating means (member) 25 that calculates the basic injection amount of fuel based on the output of the above sensor groups and a predetermined data group 24.

The air-fuel ratio control system has further:

an estimated air-fuel ratio storage means (member) 101 that stores estimated air-fuel ratios output from an neural network (abbreviated to NN hereafter), renewing the storage at each control cycle with the newest n samples, an injected-fuel amount storage means (member) 28 that stores the past data of the fuel amount injected to each cylinder, renewing the storage at each control cycle with the newest m samples, a conversion means (member) 29 that converts each value detected by the above sensor groups and each value of estimated air-fuel ratios and injected-fuel amounts stored by the above storage means into input data for the NN, a neuro-computing means (member) 102 that reads the input data given by the conversion means 29 and performs in real time the neuro-computation of the pre-trained NN to output an estimate of actual air-fuel ratios varying with a delay, a correction-amount calculating means (member) 211 that calculates the correction amount of injected fuel based on the output of the forward neuro-computing means 210 to make actual air-fuel ratios equal to a target air-fuel ratio, a fuel injection means (member) 212 that injects to the engine 26 the fuel amount obtained by adding the basic injection amount obtained by the basic-fuel calculating means 25 and the correction injection amount obtained by the correction-amount calculating means 211.

The air-fuel ratio control system of the present embodiment can calculate estimates of actual air-fuel ratios by the above configuration without using an air-fuel ratio sensor.

Fourth Embodiment

The present invention provides another configuration of an air-fuel ratio control system described in the following.

Figure 11:
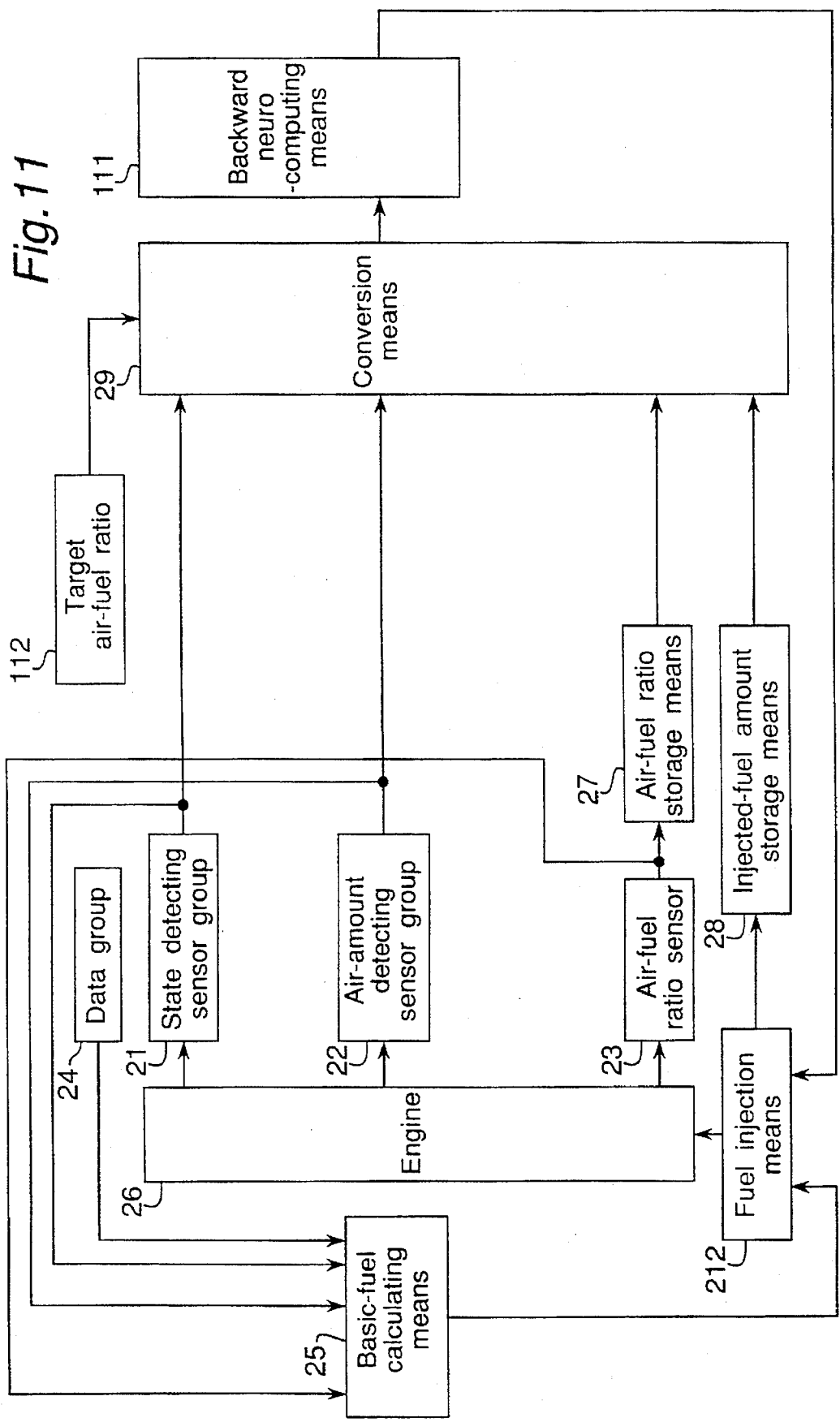
FIG. 11 is a block diagram illustrating a fourth embodiment in accordance with the present invention.

FIG. 11 is a block diagram illustrating a fourth embodiment in accordance with the present invention. The air-fuel ratio control system of the present embodiment has, a state detecting sensor group 21 that detects the operating state of an internal combustion engine 26, an air-amount detecting sensor group 22 that detects the intake air amount, an air-fuel ratio sensor 23 that detects the air-fuel ratio of the exhaust gas of the engine 26, and a basic-fuel calculating means 25 that calculates the basic injection amount of fuel based on the output of the above sensor groups and a predetermined data group 24.

The air-fuel ratio control system has further, an air-fuel ratio storage means (member) 27 that stores the past data detected by the air-fuel ratio sensor 23, renewing the storage at each control cycle with the newest n samples, an injected-fuel amount storage means 28 that stores the past data of the fuel amount injected to each cylinder, renewing the storage at each control cycle with the newest m samples, a conversion means (member) 29 that converts each value detected by the above sensor groups, each value of estimated air-fuel ratios and injected-fuel amounts stored by the above storage means, and a target air-fuel ratio 112 into input data for a neural network (abbreviated to NN), a backward neuro-computing means (member) 111 that reads the input data given by the conversion means 29 and performs in real time the neuro-computation of the NN to output the correction amount of injected fuel to make the detected air-fuel ratio equal to the target air-fuel ratio 112, and a fuel injection means (member) 212 that injects to the engine 26 the fuel amount obtained by adding the basic injection amount obtained by the basic-fuel calculating means 25 and the correction amount obtained by the backward neuro-computing means 111.

By the above configuration, the present embodiment obviates the designing of a control system to reduce the number of development manhours.

In the case of directly computing the correction amount by an NN a stationary bias may remain between actual air-fuel ratios and a target air-fuel ratio. Thanfore, the present invention solves this problem by the following configuration.

Figure 12:
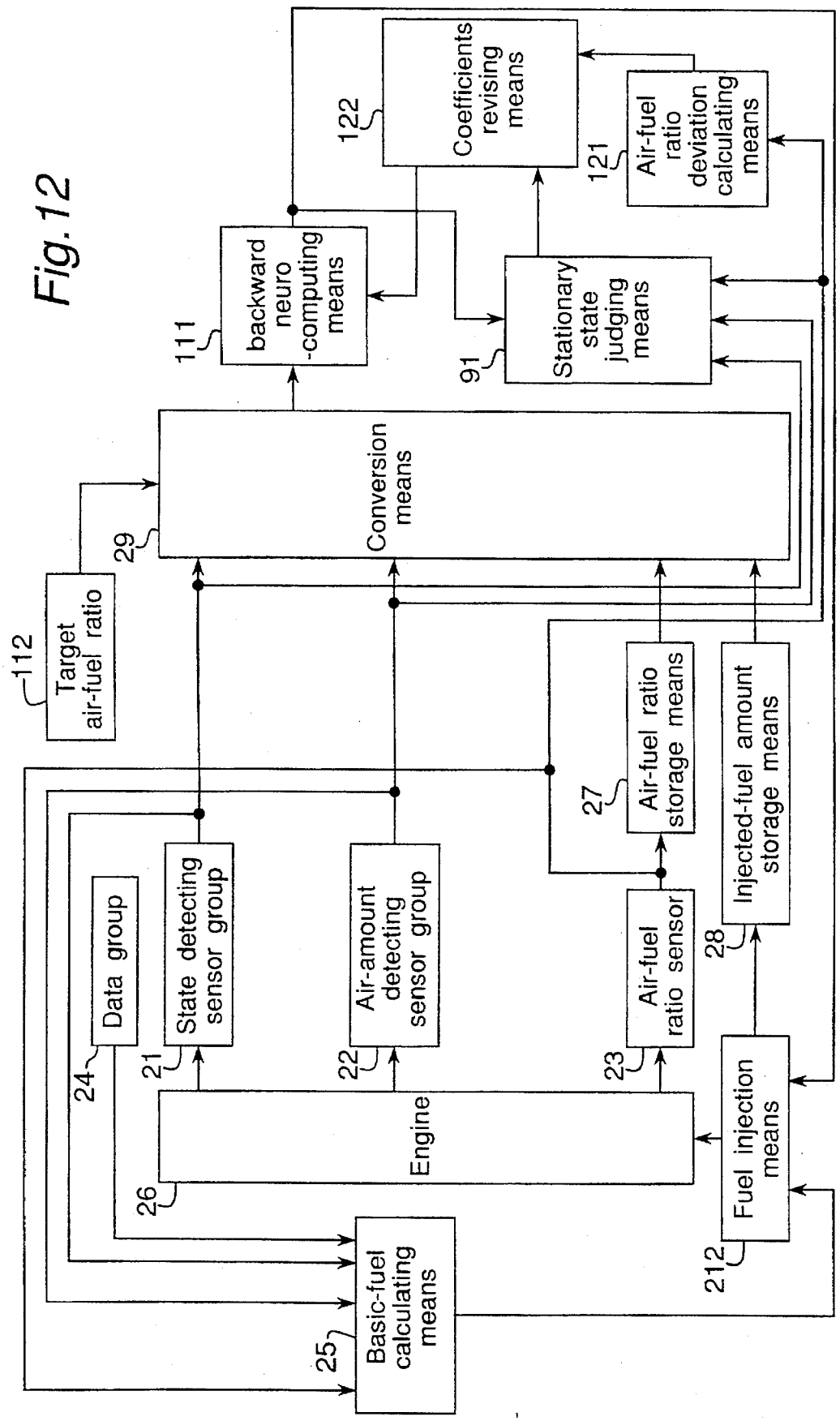
FIG. 12 is a block diagram illustrating another fourth embodiment in accordance with the present invention.

FIG. 12 is a block diagram illustrating another fourth embodiment in accordance with the present invention. The air-fuel ratio control system of the present embodiment has, a state detecting sensor group 21 that detects the operating state of an internal combustion engine 26, an air-amount detecting sensor group 22 that detects the intake air amount, an air-fuel ratio sensor 23 that detects the air-fuel ratio of the exhaust gas of the engine 26, and a basic-fuel calculating means 25 that calculates the basic injection amount of fuel based on the output of the above sensor groups and a predetermined data group 24.

The air-fuel ratio control system has further, an air-fuel ratio storage means (member) 27 that stores the past data detected by the air-fuel ratio sensor 23, renewing the storage at each control cycle with the newest n samples, an injected-fuel amount storage means 28 that stores the past data of the fuel amount injected to each cylinder, renewing the storage at each control cycle with the newest m samples, a conversion means 29 that converts each value detected by the above sensor groups and each value of estimated air-fuel ratios and injected-fuel amounts stored by the above storage means and a target air-fuel ratio 112 into input data for a neural network (abbreviated to NN), a backward neuro-computing means (member) 111 that reads the input data given by the conversion means 29 and performs in real time the neuro-computation of an NN to output the correction amount of injected fuel to make the detected air-fuel ratio equal to the target air-fuel ratio 112, a fuel injection means 212 that injects to the engine 26 the fuel amount obtained by adding the basic injection amount obtained by the basic-fuel calculating means 25 and the correction amount obtained by the backward neuro-computing means 111, an air-fuel ratio deviation calculating means (member) 121 that calculates the deviation of the air-fuel ratio detected by the air-fuel ratio sensor 23 from the target air-fuel ratio 112, a stationary state judging means (member) 91 that judges whether the operating state is the stationary state or not, based on the past record of the rate of change in the output of one of the sensors or the NN, and a coefficients revising means 122 that revises the connectivity coefficients and threshold values of the backward neuro-computing means 111 using the above deviation.

By the above configuration, the air-fuel ratio control system of the present embodiment can maintain control performance on-line, even if a stationary bias remains between actual air-fuel ratios and a target air-fuel ratio, or even if the neuro-output correction amount becomes inadequate by differences in individual vehicles and sensors or secular changes.

Fifth Embodiment

In order to raise control performance to higher accuracy in an air-fuel ratio control system, effects of the purge amount of the canister can not be ignored. Canister purging is a disturbance for the system and can not be observed by ordinary means, and a problem is how to deal with it. Therefore, the present invention provides the following configuration an air-fuel ratio control system to indirectly detect the rate of change in the purge amount to calculate the correction amount of injected fuel with greater accuracy.

Figure 13:
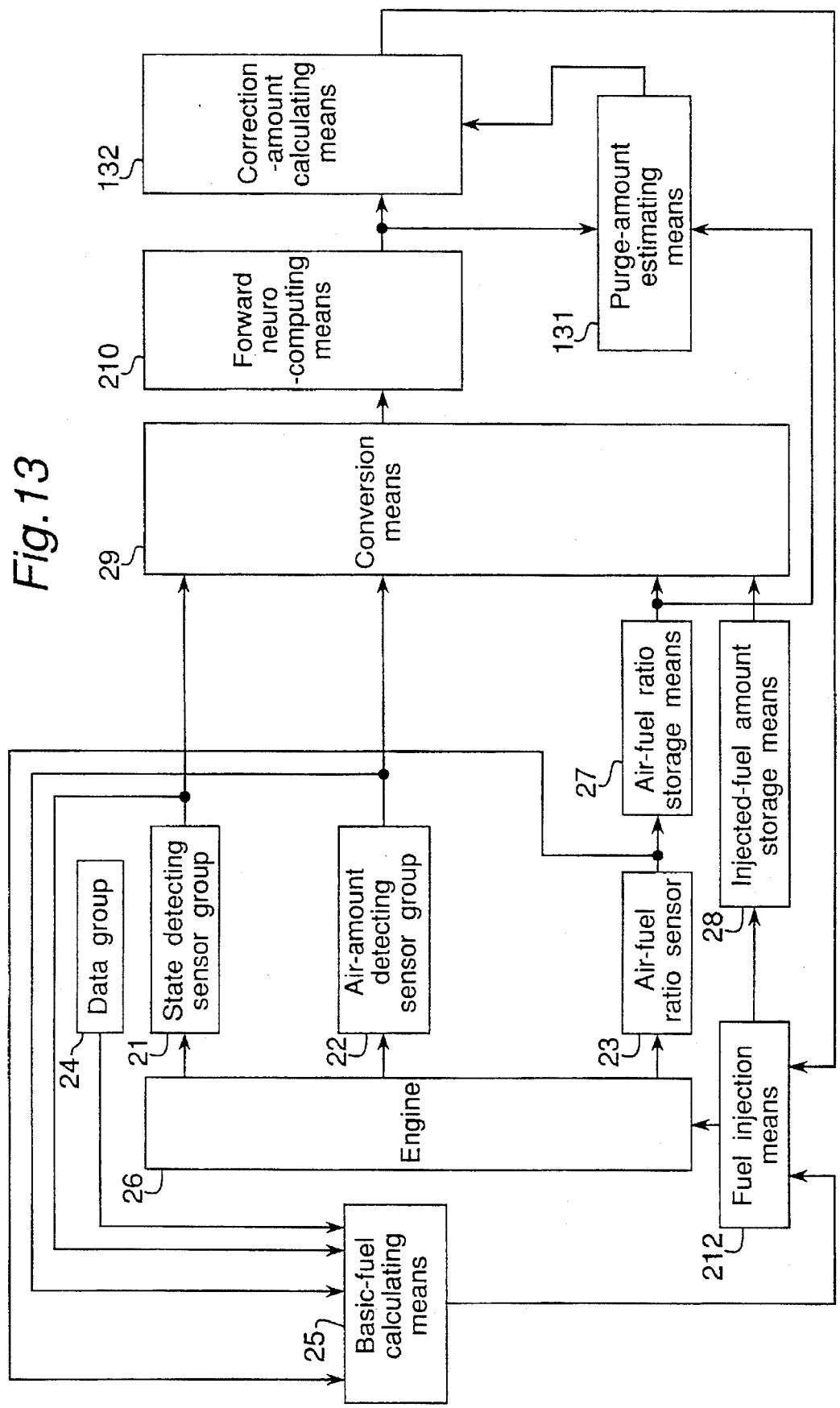
FIG. 13 is a block diagram illustrating a fifth embodiment in accordance with the present invention.

FIG. 13 is a block diagram illustrating a fifth embodiment in accordance with the present invention. The air-fuel ratio control system of the present embodiment has, a state detecting sensor group 21 that detects the operating state of an internal combustion engine 26, an air-amount detecting sensor group 22 that detects the intake air amount, an air-fuel ratio sensor 23 that detects the air-fuel ratio of the exhaust gas of the engine 26, a basic-fuel calculating means (member) 25 that calculates the basic injection amount of fuel based on the output of the above sensor groups and a predetermined data group 24, an air-fuel ratio storage means (member) 27 that stores the past data detected by the air-fuel ratio sensor 23, renewing the storage at each control cycle with the newest n samples, an injected-fuel amount storage means (member) 28 that stores the past data of the fuel amount injected to each cylinder, renewing the storage at each control cycle with the newest m samples, a conversion means (member) 29 that converts each value detected by the above sensor groups and each value of air-fuel ratios and injected-fuel amounts stored by the above storage means into input data for a neural network (abbreviated to NN), a forward neuro-computing means (member) 210 that reads the input data given by the conversion means 29 and performs in real time the neuro-computation of the pre-trained NN to output an estimate $A/F_{NN}$ of the detected air-fuel ratio varying with a delay, a purge-amount estimating means (member) 131 that estimates the increase rate of the purge amount from the past k pieces of data that are the estimates $A/F_{NN}$ and the detected air-fuel ratios respectively output from the forward neuro-computing means 210 and the air-fuel ratio sensor 23, a correction-amount calculating means (member) 132 that calculates the correction amount of injected fuel based on the output of the forward neuro-computing means 210 and the output of the purge-amount estimating means 131 to make the detected air-fuel ratio equal to a target air-fuel ratio, and a fuel injection means (member) 212 that injects to the engine 26 the fuel amount obtained by adding the basic injection amount obtained by the basic-fuel calculating means 25 and the correction injection amount obtained by the correction-amount calculating means 132.

The purge-amount estimating means 131 judges whether the purge amount is increasing or not, and estimates the increase rate of the purge amount from the past k pieces of data that are the estimated air-fuel ratios $A/F_{NN}$ and the detected air-fuel ratios respectively output from the forward neuro-computing means 210 and air-fuel ratio sensor 23. Specifically, the purge-amount estimating means 131 judges that the purge-amount is increasing, if the estimated air-fuel ratios have not changed for the past k samples, and if the detected air-fuel ratios have monotonously changed at the same time. In this case, the purge-amount estimating means 131 indirectly obtains the increase rate of the purge amount from the change of values in the past k samples of the detected air-fuel ratios. The correction-amount calculating means 131 calculates the correction amount of injected fuel by adding a term that inversely revises the correction amount against the increase rate of the purge amount to the output of the forward neuro-computing means 210. By the above means and configuration, the air-fuel ratio control system of the present embodiment can reduce the effects of canister purging, which is a disturbance for the system.

Further the following configuration can directly calculate the purge amount of the canister using a neural network.

Figure 14:
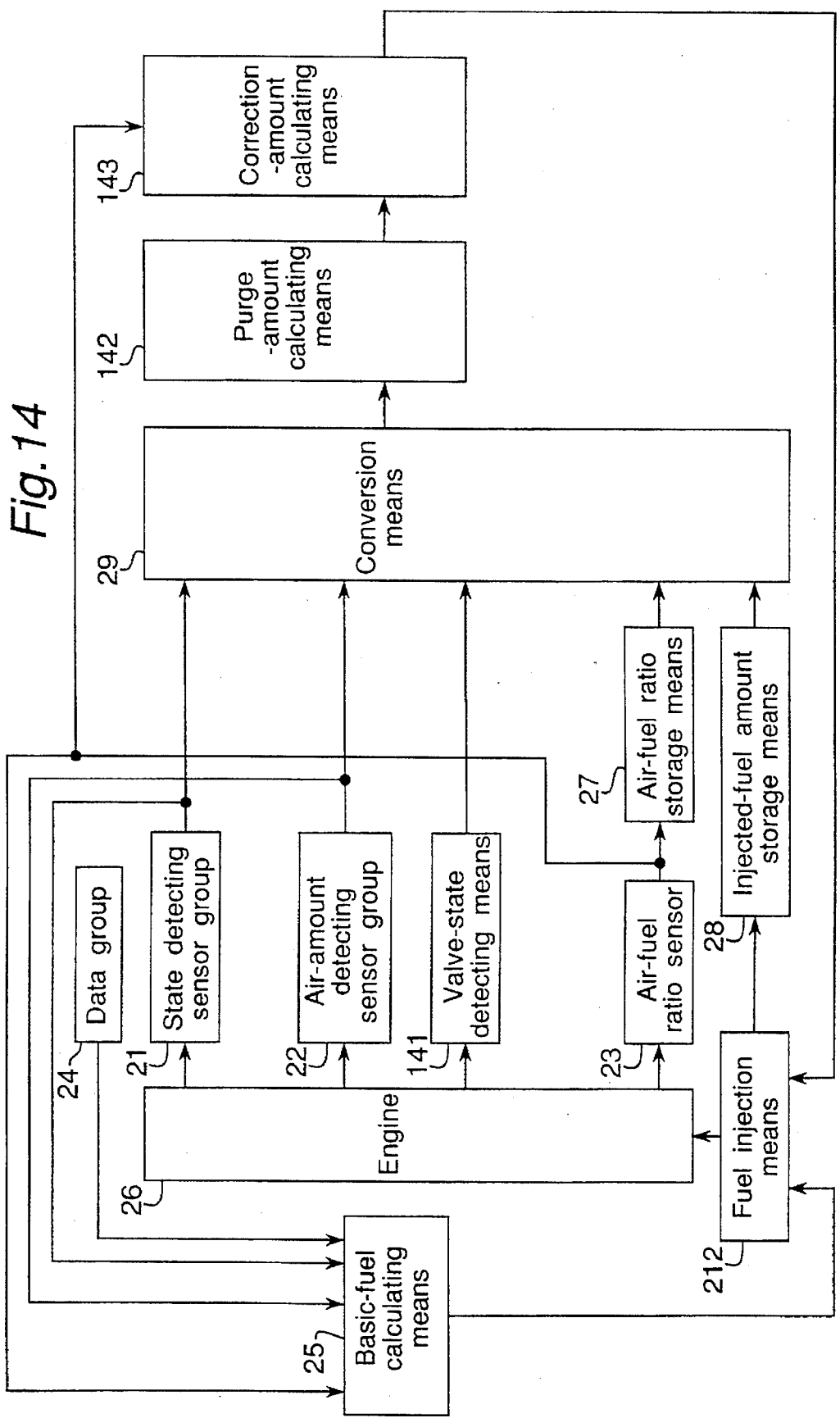
FIG. 14 is a block diagram illustrating another fifth embodiment in accordance with the present invention.

FIG. 14 is a block diagram illustrating another fifth embodiment in accordance with the present invention. The air-fuel ratio control system of the present embodiment has, a state detecting sensor group 21 that detects the operating state of an internal combustion engine 26, an air-amount detecting sensor group 22 that detects the intake air amount, an air-fuel ratio sensor 23 that detects the air-fuel ratio of the exhaust gas of the engine 26, a basic-fuel calculating means (member) 25 that calculates the basic injection amount of fuel based on the output of the above sensor groups and a predetermined data group 24, a valve-state detecting means (member) 141 that detects the state of the purge valve that opens and closes the purge line, an air-fuel ratio storage means (member) 27 that stores the past data detected by the air-fuel ratio sensor 23, renewing the storage at each control cycle with the newest n samples, an injected-fuel amount storage means (member) 28 that stores the past data of the fuel amount injected to each cylinder, renewing the storage at each control cycle with the newest m samples, a conversion means (member) 29 that converts each value detected by the above sensor groups, the valve-state value detected by the valve-state detecting means 141, and each value of air-fuel ratios and injected-fuel amounts stored by the above storage means into input data for a neural network (abbreviated to NN), a purge-amount computing means (member) 142 that reads the values output from the conversion means 29 and performs in real time the computation of the NN to output the purge amount of the canister, a correction-amount calculating means (member) 143 that calculates the correction amount of injected fuel using the output of the purge-amount calculating means 142 to make the detected air-fuel ratio equal to a target air-fuel ratio, and a fuel injection means (member) 212 that injects to the engine 26 the fuel amount obtained by adding the basic injection amount obtained by the basic-fuel calculating means 25 and the correction injection amount obtained by the correction-amount calculating means 143.

The valve-state value detected by the valve-state detecting means 141 is, for example, the valve-opening-instruction time. Further, the purge amount used for teacher data of the NN is the difference between the output of the NN that has learned during the time when purging does not occur and the output of the air-fuel ratio sensor. Then, the NN can learn how the purge amount varies depending on external environments by adding intake air temperature and the like to input data for the NN. In this way, by revising the correction amount using the purge amount, the air-fuel ratio control system of the present embodiment can reduce the effects of the canister purge, which is a disturbance for the system.

Sixth Embodiment

In the case of a multicylinder engine, accurate air-fuel ratio feedback control can be achieved, if an air-fuel ratio sensor, e.g. LAF sensor, is used for each cylinder. However, air-fuel ratio sensors are expensive, so that, in practice, a single air-fuel ratio sensor is installed for control at a location where exhaust gasses of all cylinders get together. However, the value of the air-fuel ratio sensor in this case reflects the result of the mixed exhaust gas obtained from fuel injection and ignition in all cylinders. Therefore, separate control for each cylinder can not be performed using this output value except using estimates for each cylinder by observers. The same problem remains, when estimation for air-fuel ratios is performed by neural networks. Consequently, in prior air-fuel control using a neural network, there has been a problem that the estimates significantly deviate, and control performance deteriorates in the transient state as caused by rapid opening of the throttle. However, the following configuration of the present invention can improve the performance of the control in the transient state.

FIG. 18 shows a block diagram of a sixth embodiment in accordance with the present invention. The air-fuel ratio control system of the present embodiment has the following base components in an internal combustion engine 26.

An engine speed detecting sensor 182 that detects the engine speed of the internal combustion engine 26.

An intake manifold pressure sensor 183 that detects the pressure inside the intake manifold.

A throttle position sensor 184 that detects the position of throttle movement.

An intake air temperature sensor 185 that detects the temperature of the intake air.

A coolant temperature sensor 186 that detects the temperature of the coolant.

A basic-fuel calculating means (member) 25 that calculates the basic injection amount of fuel based on the output of the above sensors and a predetermined data group.

Further, the air-fuel ratio control system has the following components.

An EGR amount detecting means (member) 181 that detects the EGR amount.

An air-fuel ratio sensor 23 that detects the air-fuel ratio of the exhaust gas of the engine 26.

An air-fuel ratio storage means (member) 187 that stores the past data detected by the air-fuel ratio sensor 23, renewing the storage at each engine step (180° crankshaft rotation) with the newest n samples, where n is the number of cylinders.

An air-fuel-ratio input selecting means (member) 188 that selects the input data for a neural network (abbreviated to NN) from the data stored by the air-fuel ratio storage means 187.

An injected-fuel amount storage means (member) 28 that stores the past data of the fuel amount injected to each cylinder, renewing the storage at each engine step with the newest n+1 samples, where n is the number of cylinders.

An injected-amount input selecting means (member) 189 that selects the input data for the NN from the data stored by the injected-fuel amount storage means 28.

A conversion means (member) 29 that converts each value detected by the above sensors, the EGR amount, the injected-fuel amounts selected by the injected-amount input selecting means 189, and the air-fuel ratios selected by the air-fuel ratio input selecting means 188 into input data for the NN.

A neuro-computing means (member) 18A that reads the input data given by the conversion means 29 and performs in real time the neuro-computation of the pre-trained NN to output an air-fuel ratio, which is a value of an internal state variable of the engine.

A differential coefficients identifying means (member) 18B that expresses the air-fuel ratio output from the neuro-computing means 18A as a function $f_{NN}$ of internal state variables, whose values are the input data for the NN obtained by the conversion means 29, and estimates the differential coefficients of the function $f_{NN}$, based on the connectivity coefficients and the intermediate-layer output of the neuro-computing means 18A.

A correction-amount calculating means (member) 18C that calculates the correction amount of injected fuel based on the output of the differential coefficients identifying means 18B to make the detected air-fuel ratio equal to a target air-fuel ratio.

A fuel injection means (member) 212 that injects to the engine 26 the fuel amount obtained by adding the basic injection amount obtained by the basic-fuel calculating means 25 and the correction injection amount obtained by the correction-amount calculating means 18C.

Generally, a model that represents the relation between changes in injected fuel amounts and changes in air-fuel ratios is a high-order delay system. The present embodiment can implement the high-order non-linear model by inputting past data to the NN using the air-fuel ratio input selecting means 188 and the injected-amount input selecting means 189, so that the accuracy of estimates is improved.

FIG. 15 shows the structure of the NN consisting of three layers: input layer, intermediate layer, and output layer, for a four cylinder engine. In FIG. 15, k is an integer renewed at each engine step (180° crankshaft rotation), Gf is the amount of injected fuel, Pb is the pressure inside the manifold, ne is the engine speed, θ is the throttle plate angle, Ta is the temperature of the intake air, Tw is the temperature of the coolant, EGR is the EGR amount, that is the EGR valve opening time, and A/F is the air-fuel ratio.

The neuro-computing means 18A constructs the NN that outputs air-fuel ratios as shown in FIG. 15. The differential coefficients identifying means 18B identifies the parameters of the engine model based on the connectivity coefficients and the intermediate-layer output of the NN. In this way, the differential coefficients identifying means 18B can obtain on-line the identification of the controlled system that varies in a complex way depending on operating conditions. Based on this result, the correction-amount calculating means 18C can design a stable control system around a current operating point using the linear control theory. Methods of designing the control system are flexible, and the present invention uses a method of assigning a pole.

The detailed method of designing the control system from identifying the parameters to calculating the correction amount of injected fuel is described in the following.

The NN shown in FIG. 15 can be regarded as a non-linear function $f_{NN}$ that outputs the air-fuel ratio $A/F_{NN}$ corresponding to the input data. If all stored data is used, then we have the following relation for the state variables:

$$A/F_k = f_{NN}(Gf_k, Gf_{k-1}, Gf_{k-2}, Gf_{k-3}, Gf_{k-4}, A/F_{k-1}, \quad (12)$$

$$A/F_{k-2}, A/F_{k-3}, A/F_{k-4}, Pb_{k-1}, ne_{k-1}, \theta_{k-1}, EGR_{k-1}).$$

Here, $A/F_k$ is assumed to be $A/F_{NN}$, and $Pb_{k-1}$, $ne_{k-1}$, $\theta_{k-1}$, $EGR_{k-1}$ are regarded as disturbances. Then the following equation is obtained by the total differentiation of $f_{NN}$:

$$
\begin{aligned}
F_{NN} &= \Delta A/F_k \quad (13)\\
&= \partial f_{NN}/\partial Gf_k \cdot \Delta Gf_k + \partial f_{NN}/\partial Gf_{k-1} \cdot \Delta Gf_{k-1} +\\
&\quad \partial f_{NN}/\partial Gf_{k-2} \cdot \Delta Gf_{k-2} +\\
&\quad \partial f_{NN}/\partial Gf_{k-3} \cdot \Delta Gf_{k-3} + \partial f_{NN}/\partial Gf_{k-4} \cdot \Delta Gf_{k-4} +\\
&\quad \partial f_{NN}/\partial A/F_{k-1} \cdot \Delta A/F_{k-1} + \partial f_{NN}/\partial A/F_{k-2} \cdot \Delta A/F_{k-2} +\\
&\quad \partial f_{NN}/\partial A/F_{k-3} \cdot \Delta A/F_{k-3} + \partial f_{NN}/\partial A/F_{k-4} \cdot \Delta A/F_{k-4}\\
&= q_0 \cdot \Delta Gf_k + q_1 \cdot \Delta Gf_{k-1} + q_2 \partial Gf_{k-2} \cdot \Delta Gf_{k-2} +\\
&\quad q_3 \cdot \Delta Gf_{k-3} + q_4 \cdot \Delta Gf_{k-4} + p_1 \cdot \Delta A/F_{k-1} +\\
&\quad p_2 \cdot \Delta A/F_{k-2} + p_3 \cdot \Delta A/F_{k-3} + p_4 \cdot \Delta A/F_{k-4}.
\end{aligned}
$$

The differential coefficients $q_i=\partial f_{NN}/\partial Gf_{k-i}$, and $P_i=\partial f_{NN}/\partial A/F_{k-i}$ are obtained as follows.

Let the connectivity coefficients between the input and intermediate layers be $W_{ij}$, and the connectivity coefficients between the intermediate and the output layers be $W_j$. Let the input variables to the input layer be $I_i$, and the output variables of the intermediate layer be $H_j$, and the output variable of the output layer be $y$ ($=A/F_{NN}$). Specifically, $I_1=Gf_k$, $I_2=Gf_{k-1}$, and so on. Then the following equations are obtained:

$$H_j=f(U_j), U_j=\Sigma W_{ij} \cdot I_i - \theta_j,$$

$$y=f_{NN}=\Sigma W_j \cdot H_j - \theta, \quad (14)$$

where $\theta_j$ and $\theta$ are respectively the threshold values in the intermediate and output layers. The function f is a sigmoid function defined by $f(x)=1/(1+\exp(-x))$. Then the above partial differential coefficients, $q_i$, $p_i$ are obtained by the following equation:

$$
\begin{aligned}
\partial f_{NN}/\partial I_i &= \Sigma\, (\partial y/\partial H_j) \cdot (\partial H_j/\partial U_j) \cdot (\partial U_j/\partial I_i) \quad (15)\\
&= \Sigma\, W_j \cdot H_j \cdot (1-H_j) \cdot W_{ij}.
\end{aligned}
$$

The equation (13) can be discretized as follows. Let z be the shift operator defined by $$a_{k+1}=z \cdot a_k,\ a_{k+2}=z^2 \cdot a_k,\ a_{k-1}=z^{-1} \cdot a_k,$$

and so on. Then the equation is discretized to the following (16) as the equation (6), if $\Delta A/F_k$ is denoted by $\Delta A/F(z)$ and $\Delta Gf_k$ is denoted by $\Delta Gf(z)$:

$$\Delta A/F(z)=(q_0 z^4+q_1 z^3+q_2 z^2+q_3 z+q_4)/(z^4-p_1 z^3-p_2 z^2-p_3 z-p_4) \cdot \Delta Gf(z). \quad (16)$$

This equation shows that air fuel-ratios are iteratively identified from the amounts of injected fuel. The feedback gain K and the correction amount are calculated using this equation.

For simplicity, a method of determining the feed back gain K and the correction amount of injected fuel is described in the following in the case where air-fuel ratio input selecting means 188 and injected-amount input selecting means 189 perform the input selection explicitly represented as variables in the following equation (17), considering only one cylinder.

$$A/F_k=f_{NN}(Gf_k, Gf_{k-4}, A/F_{k-4} Pb_{k-1}, ne_{k-1}, \theta_{k-1}). \quad (17)$$

In this case, the equation (13) becomes $$F_{NN}=\Delta A/F_k=q_0 \cdot \Delta Gf_k+q_4 \cdot \Delta Gf_{k-4}+p_4 \cdot \Delta A/F_{k-4}. \quad (18)$$

For the 4-step discretization, let z be the shift operator redefined by $$a_{k+4}=z \cdot a_k,\ a_{k-4}=z^{-1} \cdot a_k,$$

and so on. If $\Delta A/F_k$ is denoted by $\Delta A/F(z)$ and $\Delta Gf_k$ is denoted by $\Delta Gf(Z)$, then corresponding to the equation (16) we obtain $$\Delta A/F(z)=(q_0 \cdot z+q_4)/(z-p_4) \cdot \Delta Gf(z). \quad (19)$$

Now, an extended system using the state variables $X=(\Delta A/F, A/F, \Delta Gf)^T$ can be constructed and given by the following equation.

$$z \cdot X(z)=P \cdot X(z)+Q \cdot z \cdot \Delta Gf(z), \quad (20)$$

where $$P=\begin{pmatrix} p_4 & 0 & q_4 \\ 1 & 1 & 0 \\ 0 & 0 & 0 \end{pmatrix}, Q=\begin{pmatrix} q \\ 0 \\ 1 \end{pmatrix}.$$

Figure 17:
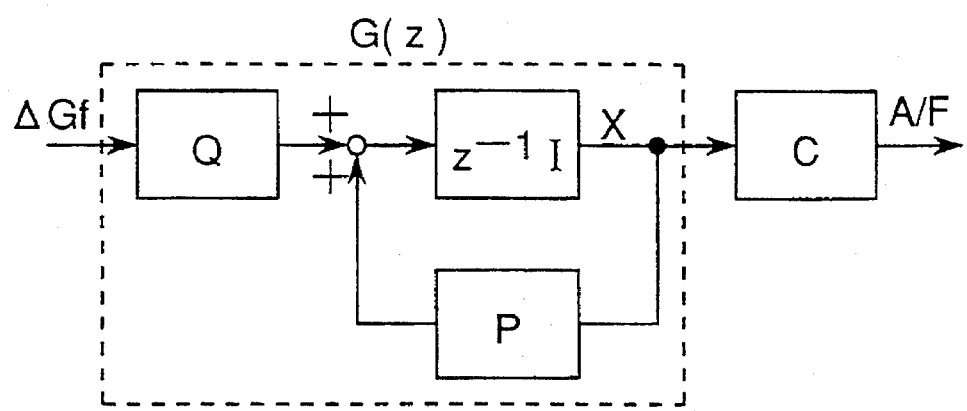
FIG. 17 is a block diagram illustrating a model that represents engine characteristics.
Figure 19:
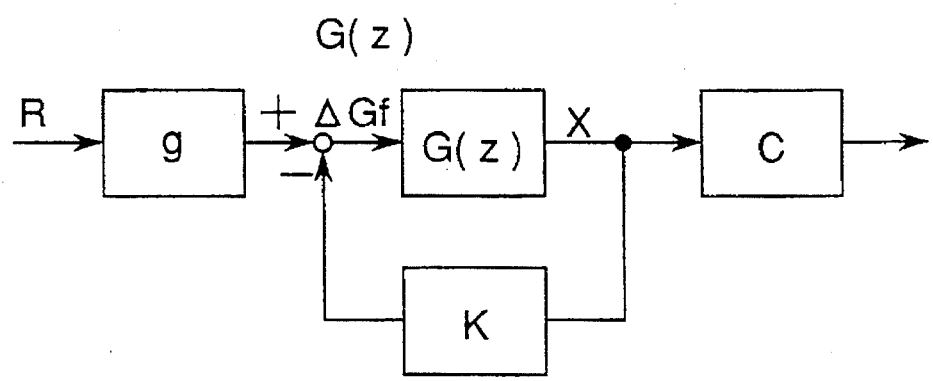
FIG. 19 is a block diagram illustrating a model that uses a method of assigning a pole.

The block diagram of this system is illustrated in FIG. 17. A system illustrated in FIG. 19 is then constructed as follows, using the feedback gain $K=(K_1, K_2, K_3)$:

$$\Delta Gf(z)=g \cdot R(z)-K \cdot X(z), \quad (21)$$

where R is a target air-fuel ratio, and g is the gain of R.

There are various methods of determining the feedback gain K. The present embodiment uses a method of assigning a pole. That is to make the characteristic roots of the characteristic equation of (21) arbitrarily given points inside the unit circle. Substituting $\Delta Gf(z)$ in (20) by (21) we obtain $$z \cdot X(z)=(P-Q \cdot K \cdot z) \cdot X(z)+Q \cdot z \cdot g \cdot R(z).$$

Therefore, we obtain the following characteristic equation of (21), where I is the 3×3 unit matrix.

$$
\begin{aligned}
f(\lambda) &= det(\lambda I - P + Q \cdot K) \quad (22)\\
&= \lambda^3 + (K_3 - 1 - p_4 + q_0 \cdot K_1) \cdot \lambda^2 +\\
&\quad (-K_3 - p_4 \cdot K_3 - q_0 \cdot K_1 + q_0 K_2 + q_4 \cdot K_1 + p_4) \cdot \lambda +\\
&\quad p_4 \cdot K_3 + q_4 \cdot K_2 - q_4 K_1.
\end{aligned}
$$

This equation shows the behavior of the closed loop of FIG. 19. Let α be an arbitrary stable pole (eigen value) such that |α|<1. Then the characteristic equation becomes $$f(\lambda)=(\lambda-\alpha)^3=\lambda^3-3\alpha \cdot \lambda^2+3\alpha^2 \cdot \lambda-\alpha^3. \quad (23)$$

Therefore, the feedback gain $K=(k_1, K_2, K_3)$ is obtained from the condition that the equations (22) and (23) are identical. Further, the gain g of R in the equation (21) is obtained from the condition that A/F becomes the target value R.

$$g=K_2. \quad (24)$$

The above procedure is summarized as follows. The parameters $q_0$, $q_4$, $p_4$, r are successively calculated by neuro-computing means 18A and differential coefficients identifying means 18B depending on operating conditions. The feedback gain K that stabilizes the control system and depends on operating conditions is calculated by correction-amount calculating means 18C using the parameters $q_0$, $q_4$, and $P_4$ and an assigned pole. Then the correction amount of injected fuel is calculated by correction-amount calculating means 18C, following the equation (21).

Figure 20:
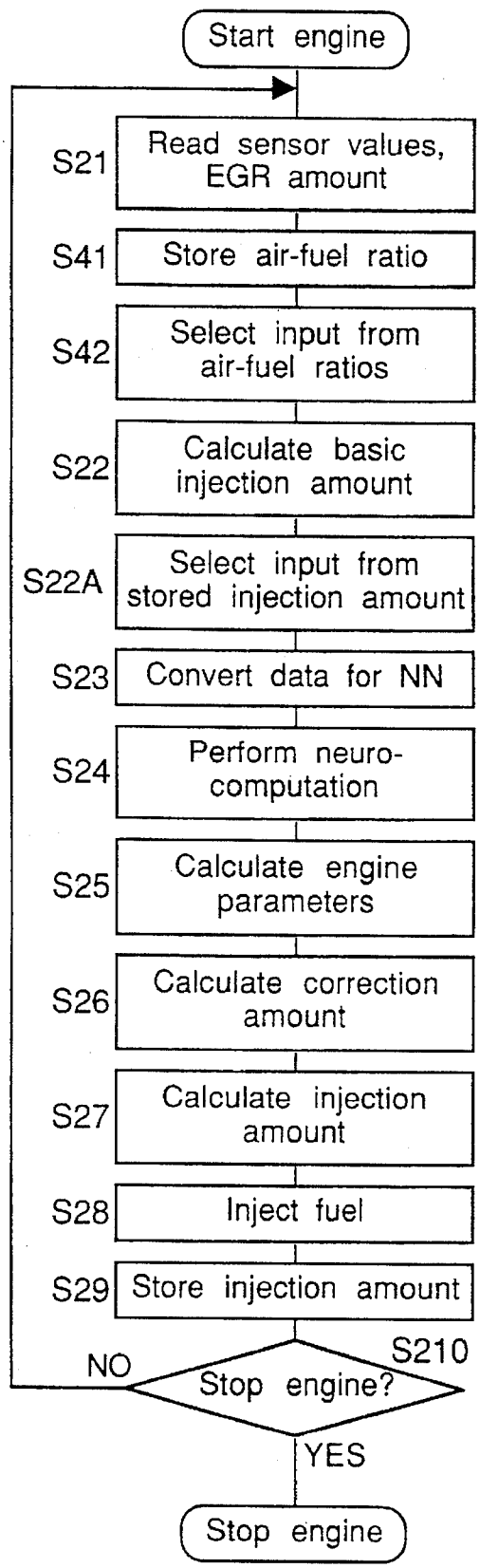
FIG. 20 is a flowchart illustrating the sixth embodiment in accordance with the present invention.

FIG. 20 is a flowchart illustrating the control flow of the air-fuel ratio control system of the sixth embodiment The loop is repeated at each engine step.

First, in Step S21, the output values of each sensor and the EGR amount are stored. In Step S41, the values detected by the air-fuel ratio sensor are stored to renew the storage with the newest past n pieces of data, where n is the number of the cylinders. In Step S42, the air-fuel ratios to be input to the NN are selected from the stored air-fuel ratio values. In Step S22, the basic injection amount is calculated by map sampling using the output of the sensors. In Step S22A, the injection amounts input to the NN are selected from the values stored in Step S29. In Step S23, the output values of sensors to be input to the NN are selected. In Step S24, the neuro-computation is performed to output the air-fuel ratio. In Step S25, the values of the parameters of the engine model are calculated using the connectivity coefficients and the output values of the intermediate layer obtained in Step S24. In Step S26, the correction amount of injected fuel is calculated using the values of the parameters calculated in Step S25 to make the detected air-fuel ratio equal to a target air-fuel ratio. In Step S27, the amount of injected fuel is obtained by adding the correction amount to the basic injection amount. In Step S28, the fuel is injected to the engine. In Step S29, the amount of injected fuel obtained by adding the correction amount to the basic injection amount is stored, renewing the storage with the past n+1 values, where n is the number of the cylinders. In Step S210, whether the engine has stopped or not is judged. If the engine has not stopped, the control flow returns to Step S21 to continue the air-fuel ratio control.

The neuro-computation of the NN consists of a great number of scalar products of two vectors, so that it takes a long time to perform the computation by a computer program. In fact, as the engine speed increases, the computation for each cylinder can not catch up with the speed. The present invention can solve this problem by the following configuration.

Seventh Embodiment

Figure 21:
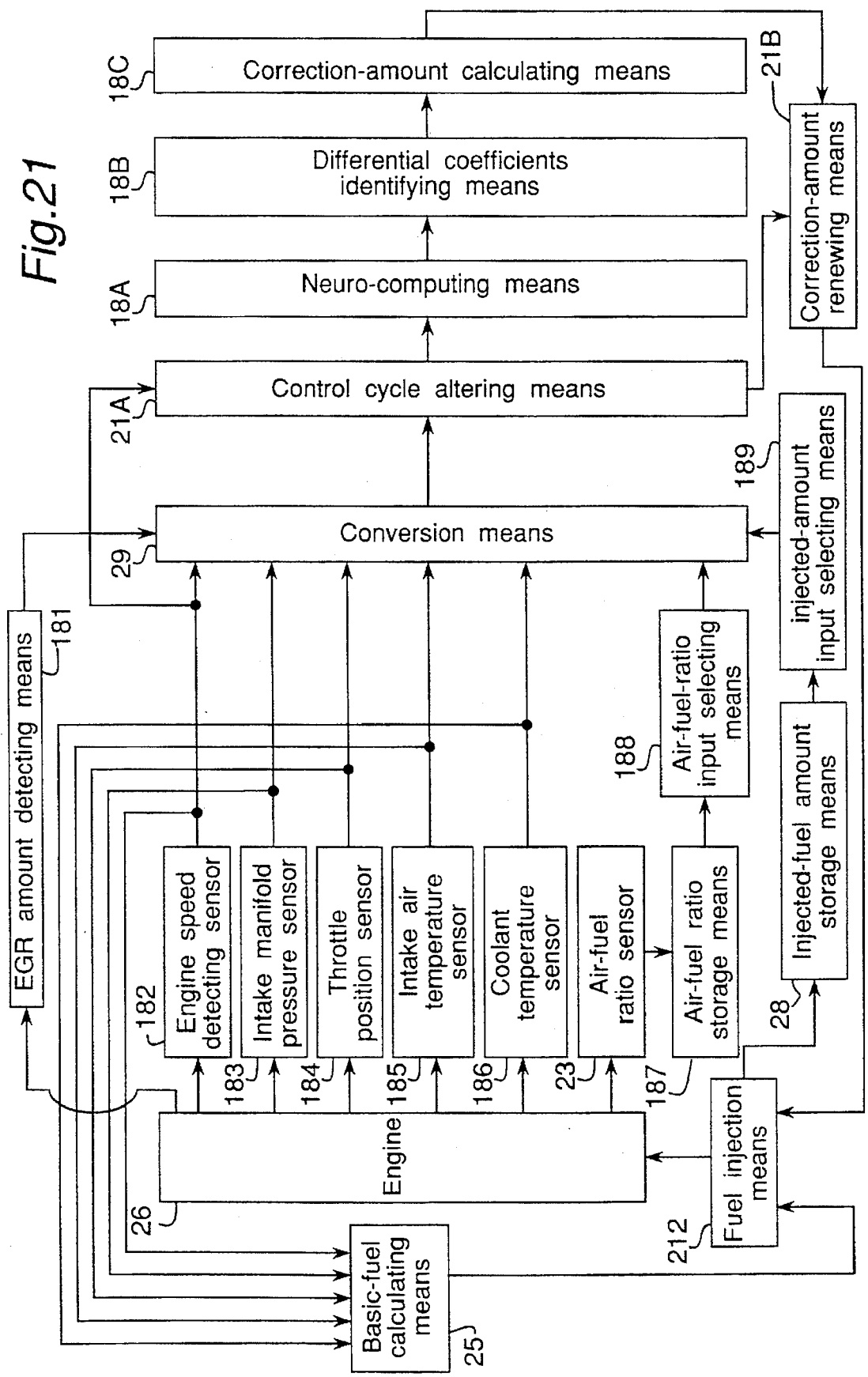
FIG. 21 is a block diagram illustrating a seventh embodiment in accordance with the present invention.

FIG. 21 is a block diagram illustrating a seventh embodiment in accordance with the present invention. In the correction-amount calculating means 18C, the formula for calculating the correction amount is discretized with the unit period k times the engine step, where k is less than or equal to the number of the cylinders. Then a control cycle altering means 21A switches the value of k depending on the engine speed, and the correction-amount calculating means 18C performs the neuro-computation once every k engine steps to calculate the correction amounts. Then a correction-amount renewing means 21B renews the correction amount once every k engine steps to inject fuel to all cylinders using the same renewed correction amount.

In this way, the air-fuel ratio control system of the present embodiment can give an optimal control cycle by the above configuration.

Figure 22:
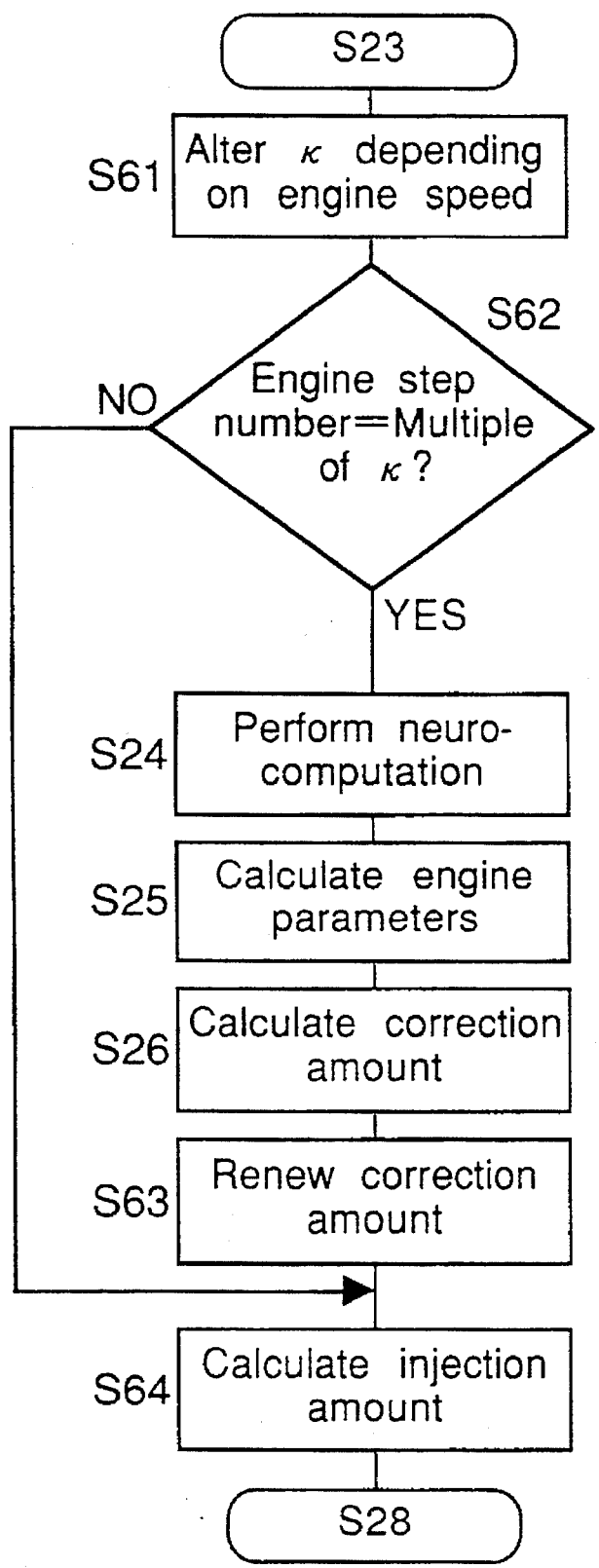
FIG. 22 is a flowchart illustrating the seventh embodiment in accordance with the present invention.

FIG. 22 is a flowchart illustrating the seventh embodiment in accordance with the present invention. In Step S61, the computation cycle for the correction injection amount is switched, depending on the engine speed, to be k times the unit engine step, where k is a natural number less than or equal to the number of the cylinders. Next, in Step S62, it is judged whether the engine step number is a multiple of k determined in Step S61.

If the current engine step number is a multiple of k, then the control flow proceeds with Step S24, in which the neuro-computation is performed. In Step S25, the values of the parameters of the engine model are calculated. In Step S26, the correction amount of injected fuel is calculated. In Step S63, the correction amount of injected fuel is renewed with the correction amount calculated in Step S26.

If the current engine step number is not a multiple of k, then the control flow proceeds with Step S64, in which the final injection amount is calculated using the correction amount calculated in the immediate past when the engine step number was a multiple of k.

For example, in the case of a 4-cylinder engine, k is determined to be 1, when the engine speed is low, so that the neuro-computation is performed at each engine step, a correction amount is calculated for each cylinder, and the basic injection amount is corrected. As the engine speed increases, k is increased, until the maximum number k=4 is attained. When k=4, the neuro-computation is performed once every 4 steps of the engine for a certain cylinder. The injection amounts for all cylinders are corrected using the same correction amount for that cylinder obtained from the neuro-computation.

Eighth Embodiment

For the need that only an ordinary operating range is covered for air-fuel ratio correction, as the correction is not performed at wide-open throttle, or the need that the structure of the NN is minimized for some reasons such as computation time, the present invention provides the following configuration.

Figure 23:
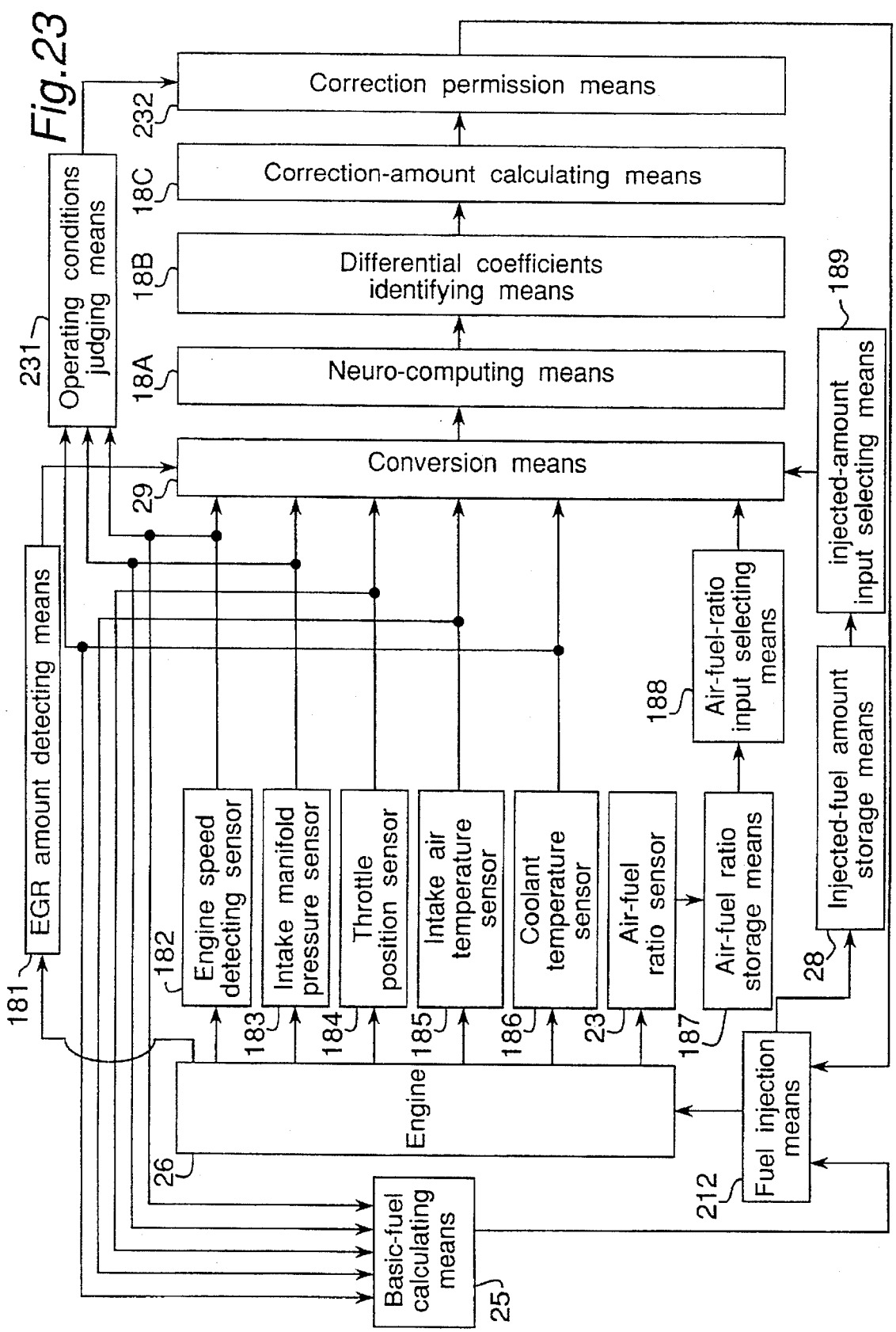
FIG. 23 is a block diagram illustrating an eighth embodiment in accordance with the present invention.

FIG. 23 is a block diagram illustrating an eighth embodiment in accordance with the present invention. The air-fuel ratio control system of the present embodiment has, an operating conditions judging means (member) 231 that judges whether operating conditions are in a predetermined state or not based on the engine speed, the pressure inside the intake manifold, and the temperature of the coolant, and a correction permission means (member) 232 that issues the permission of adding the correction amount calculated by the correction-amount calculating means 18C to the basic injection amount.

Figure 24:
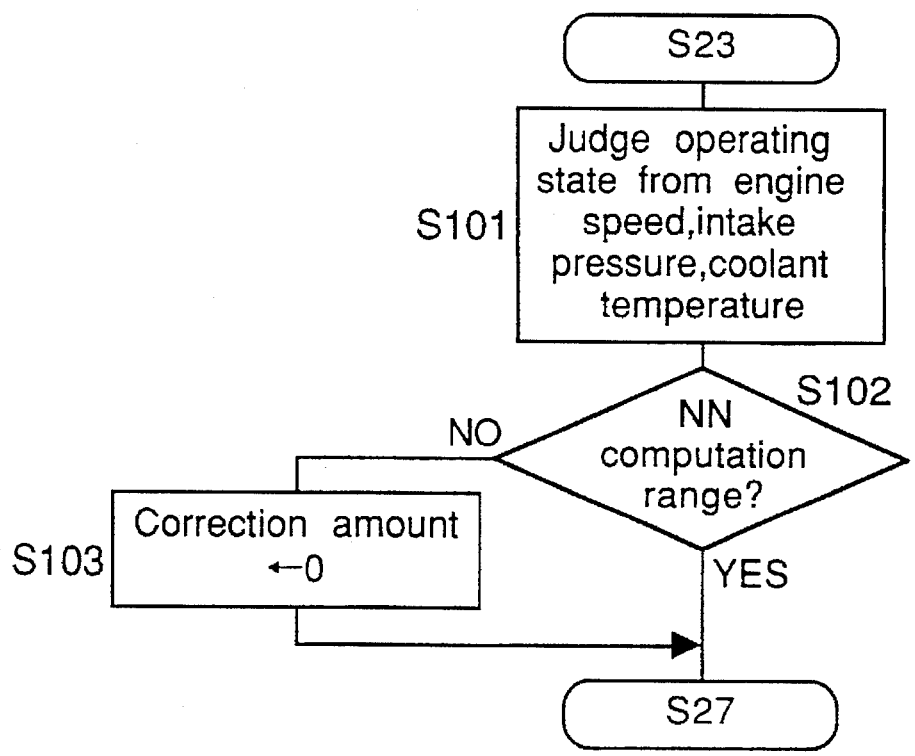
FIG. 24 is a flowchart illustrating the eighth embodiment in accordance with the present invention.

FIG. 24 is a flowchart illustrating the control flow of the correction injection amount control in the eighth embodiment In Step S101, the operating conditions are judged based on the engine speed, pressure inside the intake manifold, and temperature of the coolant. In Step S102, it is judged whether the judged operating conditions are in a predetermined range for the neuro-computation. If the operation conditions are in the predetermined range, then in Step S27, the amount of injected fuel is obtained by adding the correction injection amount calculated in Step S27 to the basic injection amount. If the operating conditions are judged to be not in the predetermined range for the neuro-computation, then in Step S103, the correction injection amount is made zero and the control flow proceeds with Step S27.

The air fuel ratio control system of the present embodiment can realize the correction control in a small configuration, without using the neuro-data over the whole operating range.

Ninth Embodiment

The characteristics of an engine vary with its operating conditions, and its dead time differs depending on its operating ranges. There is a problem that the control diverges in an operating range where dead time is great, if the feedback gain is raised. In this case, in order to perform stable control using a single pole on the whole operating range, the assigned pole has to be altered so that the feedback gain is reduced. The present invention, therefore, provides an air-fuel ratio control system that performs accurate control over the whole operating range by assigns an optimal pole (and hence the feedback gain) depending on operating sub-ranges. The configuration of control system is described in the following.

Figure 25:
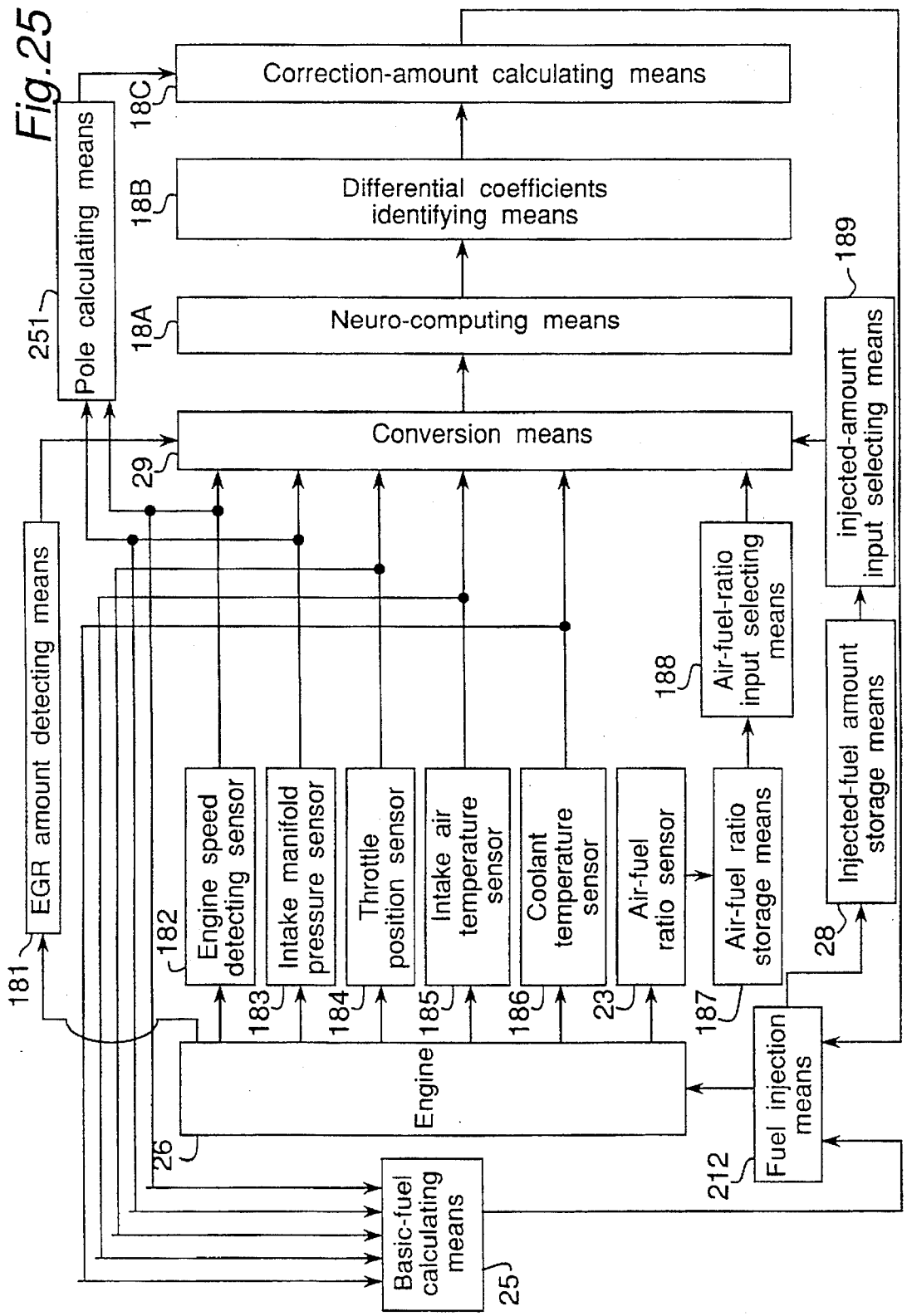
FIG. 25 is a block diagram illustrating a ninth embodiment in accordance with the present invention.

FIG. 25 is a block diagram illustrating the present Embodiment In FIG. 25, the correction-amount calculating means 18C calculates the correction injection amount based on the method of assigning a pole, using parameters obtained by the differential coefficients identifying means 18B. A pole calculating means (member) 251 determines the pole depending on the values detected by the engine speed detecting sensor 182, the intake manifold pressure sensor 183 and the like.

Figure 26:
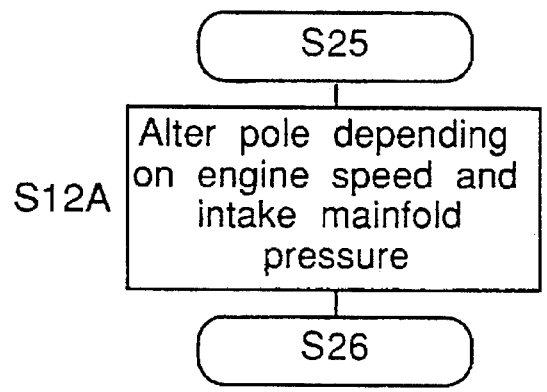
FIG. 26 is a flowchart illustrating the ninth embodiment in accordance with the present invention.

FIG. 26 is a flowchart illustrating the flow control of the present Embodiment Poles are mapped beforehand depending on engine speed and intake manifold pressure. In Step S12A, the current pole is switched to the pole that corresponds to the engine speed and the pressure inside the intake manifold detected by the sensors. In Step S26, the correction amount is calculated using the switched pole.

By the above configuration, the air-fuel ratio control system of the present embodiment can perform optimal control depending on operating ranges.

Tenth Embodiment

Since there is dead time between the injection of fuel and the detection of the air-fuel ratio, the estimates of air-fuel ratios output from the NN are not accurate in the transient state compared with actual air-fuel ratios. Therefore, the present invention improves the accuracy of neuro-estimates by inputting the change amounts of values detected by the sensors.

FIG. 27 is a block diagram illustrating a tenth embodiment in accordance with the present invention. The air-fuel ratio control system of the present embodiment has, an engine speed detecting sensor 182 that detects the engine speed of an internal combustion engine 26, an intake manifold pressure sensor 183 that detects the pressure inside the intake manifold, a throttle position sensor 184 that detects the position of throttle movement, an intake air temperature sensor 185 that detects the temperature of the intake air, a coolant temperature sensor 186 that detects the temperature of the coolant, and a basic-fuel calculating means (member) 25 that calculates the basic injection amount of fuel based on the output of the above sensors and a predetermined data group.

The air-fuel ratio control system has further, an EGR amount detecting means (member) 181 that detects the EGR amount, an injected-amount detecting means (member) 271 that detects the fuel amount actually injected to each cylinder, an air-fuel ratio sensor 23 that detects the air-fuel ratio of the exhaust gas of the engine 26, a data storage means (member) 272 that stores the values detected by the sensors, the EGR amount, and the injected fuel amount at each engine step (180° crankshaft rotation), renewing the storage with the newest data at timing points $k_1$ to $k_n$, where n is the number of cylinders, a conversion means (member) 29 that converts the values stored by the data storage means 272 into input data for the NN, a neuro-computing means (member) 18A that reads the input data given by the conversion means 29 and performs in real time the neuro-computation of the pre-trained NN to output an estimate of the detected air-fuel ratio, which is a value of an internal state variable of the engine 26, a correction-amount calculating means (member) 273 that calculates the correction amount of injected fuel based on the estimate to make the detected air-fuel ratio equal to a target air-fuel ratio, and a fuel injection means (member) 212 that injects to the engine 26 the fuel amount obtained by adding the basic injection amount obtained by the basic-fuel calculating means 25 and the correction injection amount obtained by the correction-amount calculating means 273.

The air-fuel ratio control system of the present embodiment adds the change amounts, i.e. the differentials, of the values detected by the sensors to the input layer of an NN. The NN becomes to have an expectation function in this way, so that the air-fuel ratio control system can improve the accuracy of estimates for an air-fuel ratio control system having dead time.

Eleventh Embodiment

In the air-fuel ratio control systems described so far use the output of LAF sensors for the input to the NN. However, among current air-fuel ratio control systems, there are few passenger cars that have an LAF sensor, and many current air-fuel control systems in passenger cars use an $O_2$ sensor that measures oxygen concentration in the exhaust gas. However the output of an $O_2$ sensor is two-valued, so that air-fuel ratios can not be obtained linearly. Consequently, it has been hard to construct an air-fuel ratio control system that accurately responses to a target air-fuel ratio. Therefore, the present invention designs an NN that learns beforehand from a teacher signal that is the output of an LAF sensor and input data output from the $O_2$ sensor. Using this trained NN, an air-fuel ratio control system of the present invention can perform accurate air-fuel ratio control using an $O_2$ sensor in place of an LAF sensor. A configuration of such an air-fuel ratio control system is described in the following.

FIG. 28 is a block diagram illustrating an eleventh embodiment in accordance with the present invention. The air-fuel ratio control system of the present embodiment has, an engine speed detecting sensor 182 that detects the engine speed of an internal combustion engine 26, an intake manifold pressure sensor 183 that detects the pressure inside the intake manifold, a throttle position sensor 184 that detects the position of throttle movement, an intake air temperature sensor 185 that detects the temperature of the intake air, a coolant temperature sensor 186 that detects the temperature of the coolant, and a basic-fuel calculating means (member) 25 that calculates the basic injection amount of fuel based on the output of the above sensors and a predetermined data group.

The air-fuel ratio control system has further, an EGR amount detecting means (means) 181 that detects the EGR amount, an $O_2$ sensor 281 that detects oxygen concentration in the exhaust gas, an oxygen-concentration integrating means (member) 282 that integrates the output of the $O_2$ sensor 281 to calculate the integral value of the oxygen concentration, an oxygen-concentration differentiating means (member) 283 that calculates the differential value of the output of the $O_2$ sensor 281, an injected-amount detecting means (member) 271 that detects the fuel amount actually injected to each cylinder, a conversion means (member) 29 that converts the values detected by the sensors, the EGR amount, the detected amount of fuel injection, the integral value of the oxygen concentration, and the differential value of the oxygen concentration into input data for the NN, a neuro-computing means (member) 18A that reads the input data given by the conversion means 29 and performs in real time the neuro-computation of the pre-trained NN to output an estimate of actual air-fuel ratios, which are values of an internal state variable of the engine, a correction-amount calculating means (member) 273 that calculates the correction amount of injected fuel based on the estimate to make actual air-fuel ratios equal to a target air-fuel ratio, and a fuel injection means (member) 212 that injects to the engine 26 the fuel amount obtained by adding the basic injection amount obtained by the basic-fuel calculating means 25 and the correction injection amount obtained by the correction-amount calculating means 273.

By the above configuration, the air-fuel ratio control system of the present embodiment can perform accurate air-fuel ratio control by obtaining in real time an estimate of actual air-fuel ratios, as the output of the NN, based on the output of the $O_2$ sensor.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A vehicle control system which controls a controlled object in a vehicle, particularly in an engine, having an dead time between an input and an output thereof, particularly the dead time varying depending on operating conditions in a vehicle control, particularly in an engine control, said vehicle control system comprising:

a data sampling means which samples an input data sequence from various sensor output data, each of which contains the input or output values of said controlled object or at least one of a plurality of parameters, each of which becomes a factor for the dead time;

a teacher data generating means which generates a teacher data sequence corresponding to each element in said input data sequence sampled by said data sampling means, by manipulating the dead time varying depending on values of the parameters;

a connectivity-coefficients learning means which learns characteristics of said controlled object having the dead time to determine connectivity coefficients based on the input data sequence and the teacher data sequence;

a neuro-computing means which estimates at a timing point k an output result having the dead time corresponding to the input sampled at the timing point k using the connectivity coefficients; and a control-amount calculating means which calculates a control amount using the output result of said neuro-computing means as a feedback amount in place of the output of said controlled object sampled by said data sampling means.

2. An air-fuel ratio control system which controls an air-fuel ratio in an internal combustion engine, said air-fuel ratio control system comprising:

a state detecting sensor group which detects an operating state of said internal combustion engine;

an air-amount detecting sensor group which detects an intake air amount;

an air-fuel ratio sensor which detects the air-fuel ratio of an exhaust gas of said internal combustion engine;

a basic-fuel calculating means which calculates a basic injection amount of fuel based on output data of said sensors and a predetermined data group;

an air-fuel ratio storage means which stores past air-fuel ratio data detected by said air-fuel ratio sensor, renewing the stored data at each control cycle with the newest n data;

an injected-fuel amount storage means which stores past injection amount data of fuel injected to each cylinder in said internal combustion engine, renewing the stored data at each control cycle with the newest m data;

a conversion means which converts each of values of the data detected by said sensor groups and each of values of the air-fuel ratio data and the injected-fuel amount data stored by said storage means into input data for a neural network;

a forward neuro-computing means which reads the input data for the neural network given by said conversion means, and performs in real time a neuro-computation of the neural network, which has been trained beforehand, to output at a time k an estimate $A/F_{NN}$ of the air-fuel ratio $A/F(k+n)$ detected at a time k+n, where n is a time delay between a fuel injection and a detection of its effect and varies with operating conditions;

a fuel injection correcting means which calculates a correction injection amount of fuel in accordance with output data of said forward neuro-computing means; and a fuel injection means which injects a fuel to said internal combustion engine according to a fuel amount obtained by adding the basic injection amount obtained by said basic-fuel calculating means and the correction injection amount obtained by said fuel injection correcting means.

3. The air-fuel ratio control system of claim 2, wherein said fuel injection correcting means comprises a correction-amount calculating means which calculates the correction injection amount of fuel based on the output $A/F_{NN}$ of said forward neuro-computing means so as to make the air-fuel ratio $A/F(k+n)$ equal to a target air-fuel ratio.

4. The air-fuel ratio control system of claim 2, wherein said fuel injection correcting means comprises:

a correction-amount calculating means which calculates the correction injection amount of fuel based on the output $A/F_{NN}$ of said forward neuro-computing means so as to make the air-fuel ratio $A/F(k+n)$ equal to a target air-fuel ratio; and a control gain altering means which alters a control gain of said correction-amount calculating means depending on an amount of fuel injected by said fuel injection means.

5. The air-fuel ratio control system of claim 2, wherein said fuel injection correcting means comprises:

a correction-amount calculating means which calculates the correction injection amount of fuel, so as to make the air-fuel ratio equal to a target air-fuel ratio, by a feedback control for a deviation e of the air-fuel ratio estimate $A/F_{NN}$ which is an output of said forward neuro-computing means from the target air-fuel ratio and by a feed-forward control which uses at least one value other than the air-fuel ratio of the input data for the neural network; and a gain adjusting means which adjusts on-line a gain of the feedback control and a gain of the feed-forward control using connectivity coefficients, intermediate-layer output data, and output-layer output data of the neural network used in said forward neuro-computing means.

6. The air-fuel ratio control system of claim 2 further comprising a throttle position sensor for detecting a throttle valve angle, wherein said fuel injection correcting means comprises:

a correction-amount calculating means which calculates the correction injection amount of fuel, so as to make the air-fuel ratio equal to a target air-fuel ratio, by a control rule for a degree-of-freedom-2 control system consisting of a feedback control for a deviation e of the air-fuel ratio detected by said air-fuel ratio sensor from the target air-fuel ratio and by a feed-forward control for the throttle valve angle detected by said throttle position sensor; and a gain adjusting means which adjusts on-line a gain of the feedback control and a gain of the feed-forward control using connectivity coefficients, intermediate-layer output data, and output-layer output data of the neural network used in said forward neuro-computing means.

7. The air-fuel ratio control system of claim 2, wherein said fuel injection correcting means comprises:

a correction-amount calculating means which calculates the correction injection amount of fuel based on the air-fuel ratio estimate $A/F_{NN}$ of said forward neuro-computing means so as to make the air-fuel ratio $A/F(k+n)$ equal to a target air-fuel ratio;

a deviation calculating means which calculates a deviation of the air-fuel ratio estimate $A/F_{NN}$ of the neural network output from the air-fuel ratio detected by said air-fuel ratio sensor;

an error judging means which judges that an error has occurred due to a failure in any one of said sensors or a disconnection of wiring, if an absolute value of the deviation calculated by said deviation calculating means has exceeded a pre-set value; and a correction-stop signal generating means which issues a correction-stop signal to said correction-amount calculating means when said error judging means judges that the error has occurred, said correction-stop signal determining the correction injection amount to be zero.

8. The air-fuel ratio control system of claim 2 further comprising a fuel cut-off state judging means which judges whether a current operating state is a fuel cut-off state or not, wherein said fuel injection correcting means comprises:

a correction-amount calculating means which calculates the correction injection amount of fuel based on the air-fuel ratio estimate $A/F_{NN}$ of said forward neuro-computing means so as to make the air-fuel ratio $A/F(k+n)$ equal to a target air-fuel ratio; and a correction-amount judging means which forcedly sets the correction injection amount at zero, if a judgment result of said fuel cut-off state judging means indicates the fuel cut-off state, and which sets the correction injection amount at an output level of said correction-amount calculating means, if the current operating state recovers from the fuel cut-off state, and if the air-fuel ratio is below a pre-set air-fuel ratio.

9. The air-fuel ratio control system of claim 2, wherein said fuel injection correcting means comprises:

a first correction-amount calculating means which calculates a first correction injection amount of fuel based on output data of said forward neuro-computing means so as to make the air-fuel ratio equal to a target air-fuel ratio;

a second correction-amount calculating means which calculates a second correction injection amount of fuel by a feedback of a deviation of output data of said air-fuel ratio sensor from the target air-fuel ratio; and a filter processing means which applies a high pass filter to the first correction injection amount calculated by said first correction-amount calculating means and applies a low pass filter to the second correction injection amount calculated by said second correction-amount calculating means so as to make a sum of said two filter-applied correction injection amounts the correction injection amount of fuel.

10. The air-fuel ratio control system of claim 2, wherein said fuel injection correcting means comprises:

a filter processing means which applies a high pass filter to output data of said forward neuro-computing means and applies a low pass filter to output data of said air-fuel ratio sensor means so as to make a sum of said two filter-applied output data an output amount thereof; and a correction-amount calculating means which calculates the correction injection amount of fuel based on the output amount of said filter processing means so as to make the air-fuel ratio equal to a target air-fuel ratio.

11. The air-fuel ratio control system of claim 2, wherein said fuel injection correcting means comprises:

a deviation calculating means which calculates a deviation e of the air-fuel ratio estimate $A/F_{NN}$ of said neural network from the air-fuel ratio detected by said air-fuel ratio sensor;

a stationary state judging means which judges whether a current operating state is a stationary state or not, based on a past record of a rate of change in output data of at least one of said sensors and output data of the neural network in said forward neuro-computing means;

a threshold value revising means which revises, in the stationary state, a threshold value in an output layer of said forward neuro-computing means so as to make the air-fuel ratio estimate equal to the detected air-fuel ratio, based on the deviation e obtained by said deviation calculating means; and a correction-amount calculating means which calculates the correction injection amount of fuel based on the output data of said forward neuro-computing means so as to make the detected air-fuel ratio equal to a target air-fuel ratio.

12. An air-fuel ratio control system which controls an air-fuel ratio in an internal combustion engine, said air-fuel ratio control system comprising:

a state detecting sensor group which detects an operating state of said internal combustion engine;

an air-amount detecting sensor group which detects an intake air amount;

a basic-fuel calculating means which calculates a basic injection amount of fuel based on output data of said sensors and a predetermined data group;

an estimated air-fuel ratio storage means which stores, at each control cycle, estimated air-fuel ratio output data from an neural network, renewing the stored data with the newest n data;

an injected-fuel amount storage means which stores, at each control cycle, past data of amount of fuel injected to each cylinder in said internal combustion engine, renewing the stored data with the newest m data;

a conversion means which converts each of values detected by said sensor groups and each of values of the estimated air-fuel ratio data and the injected-fuel amount data stored by said storage means into input data for the neural network;

a neuro-computing means which reads the input data for the neural network given by said conversion means and performs in real time a neuro-computation of the neural network to output an estimate of an actual air-fuel ratio varying with a delay against a fuel injection;

a correction-amount calculating means which calculates a correction injection amount of fuel based on output data of said neuro-computing means so as to make the actual air-fuel ratio equal to a target air-fuel ratio; and a fuel injection means which injects a fuel to said internal combustion engine according to a fuel amount obtained by adding the basic injection amount obtained by said basic-fuel calculating means and the correction injection amount obtained by said correction-amount calculating means.

13. An air-fuel ratio control system which controls an air-fuel ratio in an internal combustion engine, said air-fuel ratio control system comprising:

a state detecting sensor group which detects an operating state of said internal combustion engine;

an air-amount detecting sensor group which detects an intake air amount;

an air-fuel ratio sensor which detects the air-fuel ratio of an exhaust gas of said internal combustion engine;

a basic-fuel calculating means which calculates a basic injection amount of fuel based on output data of said sensors and a predetermined data group;

an air-fuel ratio storage means which stores, at each control cycle, past air-fuel ratio data detected by said air-fuel ratio sensor, renewing the stored data with the newest n data;

an injected-fuel amount storage means which stores, at each control cycle, past data of amount of fuel injected to each cylinder in said internal combustion engine, renewing the stored data with the newest m data;

a conversion means which converts each of values of data detected by said sensor groups, each of values of the air-fuel ratio data and the injected-fuel amount data stored by said storage means, and a target air-fuel ratio into input data for a neural network;

a backward neuro-computing means which reads the input data for the neural network given by said conversion means and performs in real time a neuro-computation of the neural network to output a correction injection amount of fuel so as to make the air-fuel ratio equal to the target air-fuel ratio; and a fuel injection means which injects a fuel to said internal combustion engine according to a fuel amount obtained by adding the basic injection amount obtained by said basic-fuel calculating means and the correction injection amount obtained by said backward neuro-computing means.

14. The air-fuel ratio control system of claim 13 further comprising:

an air-fuel ratio deviation calculating means which calculates a deviation of the air-fuel ratio detected by said air-fuel ratio sensor from the target air-fuel ratio;

a stationary state judging means which judges whether a current operating state is a stationary state or not, based on a past record of a rate of change in output data of at least one of said sensors and output data of the neural network in said backward neuro-computing means; and a coefficient revising means which revises, in the stationary state, connectivity coefficients or threshold values of said backward neuro-computing means using the deviation.

15. An air-fuel ratio control system which controls an air-fuel ratio in an internal combustion engine, said air-fuel ratio control system comprising:

a state detecting sensor group which detects an operating state of said internal combustion engine;

an air-amount detecting sensor group which detects an intake air amount;

an air-fuel ratio sensor which detects the air-fuel ratio of an exhaust gas of said internal combustion engine;

a basic-fuel calculating means which calculates a basic injection amount of fuel based on output data of said sensors and a predetermined data group;

an air-fuel ratio storage means which stores, at each control cycle, past air-fuel ratio data detected by said air-fuel ratio sensor, renewing the stored data with the newest n data;

an injected-fuel amount storage means which stores, at each control cycle, past data of amount of fuel injected to each cylinder in said internal combustion engine, renewing the stored data with the newest m data;

a conversion means which converts each of values detected by said sensor groups and each of values of the air-fuel ratio data and the injected-fuel amount data stored by said storage means into input data for a neural network;

a forward neuro-computing means which reads the input data for the neural network given by said conversion means and performs in real time a neuro-computation of the neural network, which has been trained during the time when a canister purge does not occur, to output an estimate $A/F_{NN}$ of the air-fuel ratio varying with a delay against a fuel injection;

a purge-amount estimating means which estimates, at each control cycle, a purge amount from past p pieces of the air-fuel ratio estimates $A/F_{NN}$ and past q pieces of the detected air-fuel ratio data respectively output from said forward neuro-computing means and said air-fuel ratio sensor;

a correction-amount calculating means which calculates a correction injection amount of fuel based on output data of said forward neuro-computing means and output data of said purge-amount estimating means so as to make the air-fuel ratio equal to a target air-fuel ratio; and a fuel injection means which injects a fuel to said internal combustion engine according to a fuel amount obtained by adding the basic injection amount obtained by said basic-fuel calculating means and the correction injection amount obtained by said correction-amount calculating means.

16. An air-fuel ratio control system which controls an air-fuel ratio in an internal combustion engine, said air-fuel ratio control system comprising:

a state detecting sensor group which detects an operating state of said internal combustion engine;

an air-amount detecting sensor group which detects an intake air amount;

an air-fuel ratio sensor which detects the air-fuel ratio of an exhaust gas of said internal combustion engine;

a basic-fuel calculating means which calculates a basic injection amount of fuel based on output data of said sensors and a predetermined data group;

a valve-state detecting means which detects a state of a purge valve that opens and closes a purge line in said internal combustion engine;

an air-fuel ratio storage means which stores, at each control cycle, past data detected by said air-fuel ratio sensor, renewing the stored data with the newest n data;

an injected-fuel amount storage means which stores, at each control cycle, past data of amount of fuel injected to each cylinder in said internal combustion engine, renewing the stored data with the newest m data;

a conversion means which converts each of values detected by said sensor groups, the state of the purge valve detected by said valve-state detecting means, and each of values of the air-fuel ratio data and the injected-fuel amount data stored by said storage means into input data for a neural network;

a purge-amount calculating means which reads output values output from said conversion means and performs in real time a computation of the neural network to output a purge amount of a canister;

a correction-amount calculating means which calculates a correction injection amount of fuel using the output data of said air-fuel ratio sensor and output data of said purge-amount calculating means so as to make the air-fuel ratio equal to a target air-fuel ratio; and a fuel injection means which injects a fuel to said internal combustion engine according to a fuel amount obtained by adding the basic injection amount obtained by said basic-fuel calculating means and the correction injection amount obtained by said correction-amount calculating means.

17. An air-fuel ratio control system which controls an air-fuel ratio in an internal combustion engine, said air-fuel ratio control system comprising:

an engine speed detecting sensor which detects an engine speed of said internal combustion engine;

an intake manifold pressure sensor which detects a pressure inside an intake manifold;

a throttle position sensor which detects a position of a throttle valve;

an intake air temperature sensor which detects a temperature of an intake air;

a coolant temperature sensor which detects a temperature of a coolant;

a basic-fuel calculating means which calculates a basic injection amount of fuel based on output data of said sensors and a predetermined data group;

an EGR amount detecting means which detects an EGR amount;

an air-fuel ratio sensor which detects an air-fuel ratio of an exhaust gas of said internal combustion engine at a timing corresponding to a rotation cycle of said engine, particularly at every crankshaft angle of 180°;

an air-fuel ratio storage means which stores past data detected by said air-fuel ratio sensor, renewing the stored data at each engine step, that is 180° crankshaft rotation, with the newest N samples, where N is a number of cylinders in said engine;

an air-fuel-ratio input selecting means which selects input data for a neural network from the data stored by said air-fuel ratio storage means;

an injected-fuel amount storage means which stores, at each engine step, past data of amount of fuel injected to each cylinder, renewing the stored data with the newest N+1 data, where N is the number of the cylinders;

an injected-amount input selecting means which selects input data for the neural network from the data stored by said injected-fuel amount storage means;

a conversion means which converts each of values detected by said sensors, the EGR amount, the injected-fuel amount data selected by said injected-amount input selecting means, and the air-fuel ratio data selected by said air-fuel ratio input selecting means into input data for the neural network;

a neuro-computing means which reads the input data for the neural network given by said conversion means and performs in real time a neuro-computation of the neural network to output an air-fuel ratio, which is a value of an internal state variable of said internal combustion engine;

a differential coefficients identifying means which expresses the air-fuel ratio as a non-linear function $f_{NN}$ of internal state variables, whose values are the input data for said neural network obtained by said conversion means, and estimates differential coefficients of a function $F_{NN}$ which is obtained by partially differentiating said function $f_{NN}$ with said internal state variables, based on connectivity coefficients and intermediate-layer output data of said neuro-computing means;

a correction-amount calculating means which calculates a correction injection amount of fuel using parameters obtained by said differential coefficients identifying means so as to make the air-fuel ratio equal to a target air-fuel ratio; and a fuel injection means which injects a fuel to said internal combustion engine according to a fuel amount obtained by adding the basic injection amount obtained by said basic-fuel calculating means and the correction injection amount obtained by said correction-amount calculating means.

18. The air-fuel ratio control system of claim 17 wherein:

for said correction-amount calculating means, a formula for calculating the correction injection amount is expressed as a system discretized with a unit period of k times said engine step, where k is less than or equal to the number of the cylinders;

a control cycle altering means switches the value of k depending on the engine speed;

said correction-amount calculating means performs said neuro-computation once every k engine steps to calculate the correction injection amount; and a correction-amount renewing means renews the correction injection amount once every k engine step to inject a fuel for all cylinders using the renewed correction injection amount.

19. The air-fuel ratio control system of claim 17 further comprising:

an operating conditions judging means which judges whether operating conditions are in a predetermined state or not, based on the engine speed, the pressure inside the intake manifold, and the temperature of the coolant; and a correction permission means which issues a permission of adding the correction injection amount calculated by said correction-amount calculating means to the basic injection amount.

20. The air-fuel ratio control system of claim 17, wherein said correction-amount calculating means calculates the correction injection amount using parameters obtained by said differential coefficients identifying means according to a method of assigning a pole, and a pole calculating means determines the pole depending on values of the data detected by said sensors.

21. An air-fuel ratio control system which controls an air-fuel ratio in an internal combustion engine, said air-fuel ratio control system comprising:

an engine speed detecting sensor which detects an engine speed of said internal combustion engine;

an intake manifold pressure sensor which detects a pressure inside an intake manifold;

a throttle position sensor which detects a position of a throttle valve;

an intake air temperature sensor which detects a temperature of an intake air;

a coolant temperature sensor which detects a temperature of a coolant;

a basic-fuel calculating means which calculates a basic injection amount of fuel based on output data of said sensors and a predetermined data group;

an EGR amount detecting means which detects an EGR amount;

an injected-fuel amount detecting means which detects a fuel amount actually injected to each of cylinders in said internal combustion engine;

an air-fuel ratio sensor which detects the air-fuel ratio of an exhaust gas of said internal combustion engine;

a data storage means which stores values of data detected by said sensors, the EGR amount, and the injected fuel amount at each engine step, that is 180° crankshaft rotation, renewing the stored data with the newest data at timing points $k_1$ to $k_n$;

a conversion means which converts the values of the data stored by said data storage means into input data for a neural network;

a neuro-computing means which reads the input data for the neural network given by said conversion means and performs in real time a neuro-computation of the neural network to output an estimate of the air-fuel ratio, which is a value of an internal state variable of said internal combustion engine;

a correction-amount calculating means which calculates a correction injection amount of fuel based on the air-fuel ratio estimate so as to make the air-fuel ratio equal to a target air-fuel ratio; and a fuel injection means which injects a fuel to said internal combustion engine according to a fuel amount obtained by adding the basic injection amount obtained by said basic-fuel calculating means and the correction injection amount obtained by said correction-amount calculating means.

22. An air-fuel ratio control system which controls an air-fuel ratio in an internal combustion engine, said air-fuel ratio control system comprising:

an engine speed detecting sensor which detects an engine speed of said internal combustion engine;

an intake manifold pressure sensor which detects a pressure inside an intake manifold;

a throttle position sensor which detects a position of a throttle valve;

an intake air temperature sensor which detects a temperature of an intake air;

a coolant temperature sensor which detects a temperature of a coolant;

a basic-fuel calculating means which calculates a basic injection amount of fuel based on output data of said sensors and a predetermined data group;

an EGR amount detecting means which detects an EGR amount;

an $O_2$ sensor which detects an oxygen concentration in an exhaust gas;

an oxygen-concentration integrating means which integrates output data of said $O_2$ sensor to calculate an integral value of the oxygen concentration;

an oxygen-concentration differentiating means which calculates a differential value of output data of said $O_2$ sensor;

an injected-amount detecting means which detects a fuel amount actually injected to each of cylinders in said internal combustion engine;

a conversion means which converts values of the data detected by said sensors, the EGR amount, the detected amount of fuel injection, the integral value of oxygen concentration, and the differential value of oxygen concentration into input data for a neural network;

a neuro-computing means which reads the input data for the neural network given by said conversion means and performs in real time a neuro-computation of the neural network to output an estimate of actual air-fuel ratios, which are values of an internal state variable of said internal combustion engine;

a correction-amount calculating means which calculates a correction injection amount of fuel based on the air-fuel ratio estimate so as to make the air-fuel ratio equal to a target air-fuel ratio; and a fuel injection means which injects a fuel to said internal combustion engine according to a fuel amount obtained by adding the basic injection amount obtained by said basic-fuel calculating means and the correction amount obtained by said correction-amount calculating means.

* * * * *